United States Patent
Bohl et al.

(10) Patent No.: US 11,605,252 B2
(45) Date of Patent: Mar. 14, 2023

(54) SYSTEMS AND METHODS FOR IN-VEHICLE PREDICTIVE FAILURE DETECTION

(71) Applicant: Harman International Industries, Incorporated, Stamford, CT (US)

(72) Inventors: Greg Bohl, Muenster, TX (US); Nikhil Patel, Plano, TX (US)

(73) Assignee: Harman International Industries, Incorporated, Stamford, CT (US)

(*) Notice: Subject to any disclaimer, the term of this patent is extended or adjusted under 35 U.S.C. 154(b) by 124 days.

(21) Appl. No.: 16/340,375

(22) PCT Filed: Oct. 12, 2017

(86) PCT No.: PCT/IB2017/056297
§ 371 (c)(1),
(2) Date: Apr. 8, 2019

(87) PCT Pub. No.: WO2018/069853
PCT Pub. Date: Apr. 19, 2018

(65) Prior Publication Data
US 2020/0051347 A1  Feb. 13, 2020

Related U.S. Application Data

(60) Provisional application No. 62/407,359, filed on Oct. 12, 2016.

(51) Int. Cl.
*G07C 5/08* (2006.01)
*G06N 20/00* (2019.01)
(Continued)

(52) U.S. Cl.
CPC ....... *G07C 5/0816* (2013.01); *G05B 23/0272* (2013.01); *G06N 7/005* (2013.01);
(Continued)

(58) Field of Classification Search
CPC .............. G07C 5/0816; G07C 5/816; G05B 23/0275; G05B 23/0254; G05B 23/0278; G05B 23/0272; G05B 23/0283
See application file for complete search history.

(56) References Cited

U.S. PATENT DOCUMENTS

| | | | | |
|---|---|---|---|---|
| 2011/0046842 | A1* | 2/2011 | Smith | ............. G07C 5/008 701/31.4 |
| 2011/0118932 | A1* | 5/2011 | Singh | ............. G05B 23/0232 714/E11.029 |

(Continued)

FOREIGN PATENT DOCUMENTS

| | | |
|---|---|---|
| JP | 2006053016 A | 2/2006 |
| JP | 2016049385 A | 4/2016 |

(Continued)

OTHER PUBLICATIONS

"Predictive Reliability Mining for Early Warnings in Populations of Connected Machines" to Singh et al., TCS Research, p. 1-10 (2015).*

(Continued)

*Primary Examiner* — Kenneth J Malkowski
(74) *Attorney, Agent, or Firm* — McCoy Russell LLP

(57) ABSTRACT

Systems and methods for predictively detecting vehicle failure based on diagnostic trouble codes are provided. In one example, a method is provided, comprising determining a probability of failure of a vehicle based on one or more diagnostic trouble codes (DTCs); and indicating to an operator of the vehicle that failure is likely in response to the probability exceeding a threshold.

10 Claims, 17 Drawing Sheets

(51) Int. Cl.
  *G05B 23/02* (2006.01)
  *G06N 7/00* (2023.01)
  *G07C 5/00* (2006.01)

(52) U.S. Cl.
  CPC ............ *G06N 20/00* (2019.01); *G07C 5/006* (2013.01); *G07C 5/008* (2013.01)

(56) References Cited

U.S. PATENT DOCUMENTS

| | | | |
|---|---|---|---|
| 2011/0172874 A1* | 7/2011 | Patnaik | G06F 11/008 701/31.4 |
| 2012/0116631 A1 | 5/2012 | Lee et al. | |
| 2013/0124032 A1 | 5/2013 | Singh et al. | |
| 2013/0159240 A1* | 6/2013 | Singh | G07C 5/0816 706/51 |
| 2014/0088815 A1* | 3/2014 | Kitagishi | B60W 50/0098 701/29.1 |
| 2016/0035150 A1* | 2/2016 | Barfield, Jr. | G05B 23/0254 701/29.3 |
| 2016/0112216 A1* | 4/2016 | Sargent | G07C 5/0808 370/328 |
| 2017/0109222 A1* | 4/2017 | Singh | G06F 11/0772 |

FOREIGN PATENT DOCUMENTS

| | | |
|---|---|---|
| JP | 2016161475 A | 9/2016 |
| WO | 2013047408 A1 | 4/2013 |

OTHER PUBLICATIONS

ISA European Patent Office, International Search Report Issued in Application No. PCT/IB2017/056297, dated Jan. 15, 2018, WIPO, 2 pages.
Korean Intellectual Property Office, Office Action Issued in Application No. 10-2019-7010295, dated May 7, 2021, 69 pages.
Kishimoto, H., "CM-100," Japanese Journal of Clinical Medicine, Osteoporosis, vol. 62, 2004, 8 pages (See NPL 3, Japanese Office Action Issued in Application No. 2019-519711 for Explanation of Relevance).
Takenaka, K., Japanese Journal of Medical Ultrasonics, Program and Abstracts of the 86th Meeting, May 24, 2013, Osaka, Japan, 6 pages. (See NPL 3, Japanese Office Action Issued in Application No. 2019-519711 for Explanation of Relevance).
Japanese Patent Office, Office Action Issued in Application No. 2019-519711, dated Apr. 22, 2022, 15 pages.
Japanese Patent Office, Office Action Issued in Application No. 2019-519711, dated Oct. 4, 2021, 12 pages.

* cited by examiner

1200

| Battery Voltage |
|---|
| Battery Voltage |
| 5.745 |
| 5.745-10.28 |
| 10.28-13.97 |
| 13.97-15.17 |
| 15.17 |
| N/A |

| Odometer |
|---|
| Odometer |
| 2743 |
| 2743-50940 |
| 50940-154700 |
| 154700 |

| Number of DTCs |
|---|
| Number of DTCs |
| 9 |
| 9-40 |
| 40 |

US 11,605,252 B2

SYSTEMS AND METHODS FOR IN-VEHICLE PREDICTIVE FAILURE DETECTION

CROSS REFERENCE TO RELATED APPLICATIONS

The present application is a national phase of International Application No. PCT/IB2017/056297 entitled "SYSTEMS AND METHODS FOR IN-VEHICLE PREDICTIVE FAILURE DETECTION", and filed on Oct. 12, 2017. International Application No. PCT/IB2017/056297 claims priority to U.S. Provisional Application No. 62/407,359, entitled "SYSTEMS AND METHODS FOR IN-VEHICLE PREDICTIVE FAILURE DETECTION," filed on Oct. 12, 2016. The entire contents of each of the above-identified applications are hereby incorporated by reference for all purposes.

FIELD

The present disclosure relates to the field of analytic models used to predict outcome, more particularly to predict future automotive failures and repairs for products (vehicles) of an automotive Original Equipment Manufacturer (OEM) while under a factory warranty.

BACKGROUND

Automotive OEMs continually strive to build better products and reduce the number of repairs required during the lifetime of the vehicle. To bolster consumer confidence, a warranty is provided with every new vehicle. However, even with a warranty in place, the perception of quality, real or not diminishes with the number of times a vehicle returns for a warranty repair.

SUMMARY

By using a predictive analytics model on a vehicle make and model, an OEM may reduce the total number of times a vehicle is brought in for repair, improve the product before high volume repair is needed, and potentially avoid large scale recalls. In this regard, there is a use for a system which is able to predict vehicle failures before they happen; by predictively detecting vehicle failures, undesirable consequences such as breakdowns and roadside repairs may be avoided, thereby improving the consumer's perception of vehicle quality and consumer confidence. Further, predictive analytics may enable the OEM to observe failure trends as they occur, thereby preventing costly and inconvenient large-scale recalls. Still other benefits will become apparent in the following description.

The above objects may be achieved with an in-vehicle predictive failure detection system, in accordance with one or more aspects of this disclosure. This disclosure provides both a statistical model and a method which establishes attribution between existing warranty claims and the Diagnostic Trouble Code (DTC) produced by a vehicle, as well as the causal relationship between the DTCs themselves. When implemented in a predictive framework, this can reduce warranty expense and unforeseen issues. A predictive model in accordance with this disclosure may provide early warning of a failure based on detection of a pattern of DTCs.

The above named objects may be achieved by a method, comprising determining a probability of failure of a vehicle based on one or more diagnostic trouble codes (DTCs); and indicating to an operator of the vehicle that failure is likely in response to the probability exceeding a threshold. The determining may be based on comparing the one or more DTCs to one or more trained model objects. The trained model objects may be generated using machine learning algorithms performed on historical DTC data. The determining may be further based on a plurality of operating conditions comprising an odometer reading and a battery voltage.

In some examples, the indicating may include displaying a textual message via a screen, the textual message including instructions. The instructions may include a recommended number of days in which to visit a mechanic or service station. The recommended number of days may be based on the probability, a greater number of days being recommended for a lower probability and a smaller number of days being recommended for a higher probability; and wherein the number of days is further based on a vehicle subsystem generating the DTCs. The threshold may be selected based on a vehicle subsystem generating the DTCs.

In other examples the above-named objects may be achieved by a system, comprising a vehicle, a plurality of vehicle subsystems, a controller with machine-readable instructions stored in non-transitory memory, for: receiving one or more diagnostic trouble codes (DTCs) from the vehicle subsystems, generating a probability of failure of the vehicle by comparing the one or more DTCs to one or more trained model objects, and indicating to an operator of the vehicle that failure is likely if the probability exceeds a threshold.

Additionally or alternatively, these objects may be achieved by a method, comprising receiving a diagnostic trouble code (DTC) and an engine operating parameter; comparing the DTC and engine operating parameter to a trained model object to generate a probability of failure of a vehicle and an instruction; and in response to the probability of failure being greater than a threshold, displaying the instruction to an operator of the vehicle on a screen.

BRIEF DESCRIPTION OF THE DRAWINGS

The disclosure may be better understood from reading the following description of non-limiting embodiments, with reference to the attached drawings, wherein below.

DETAILED DESCRIPTION

As noted above, systems and methods for the in-vehicle predictive failure detection systems and methods are provided. The following is a table which includes definitions of terms as used herein:

| | |
|---|---|
| DTC | Diagnostic Trouble Code - unit of analysis for this report |
| Full DTC | Module-DTC-Type Description |
| DID | Data Identifier - more granular data like Battery Voltage, Odometer |
| Session | Collection of DTCs obtained from the car by plugging in a SDD at the time of service or repair. Sessions can be of different types:<br>Roadside Assist<br>Diagnosis<br>Kpmp<br>PDI<br>Service Action<br>Service Function<br>Service Shortcuts<br>Toolbox |
| Failure Session | Roadside Assist Case |
| Non-Failure Session | Service cars with 'Service Function' session type |

Figure 1:
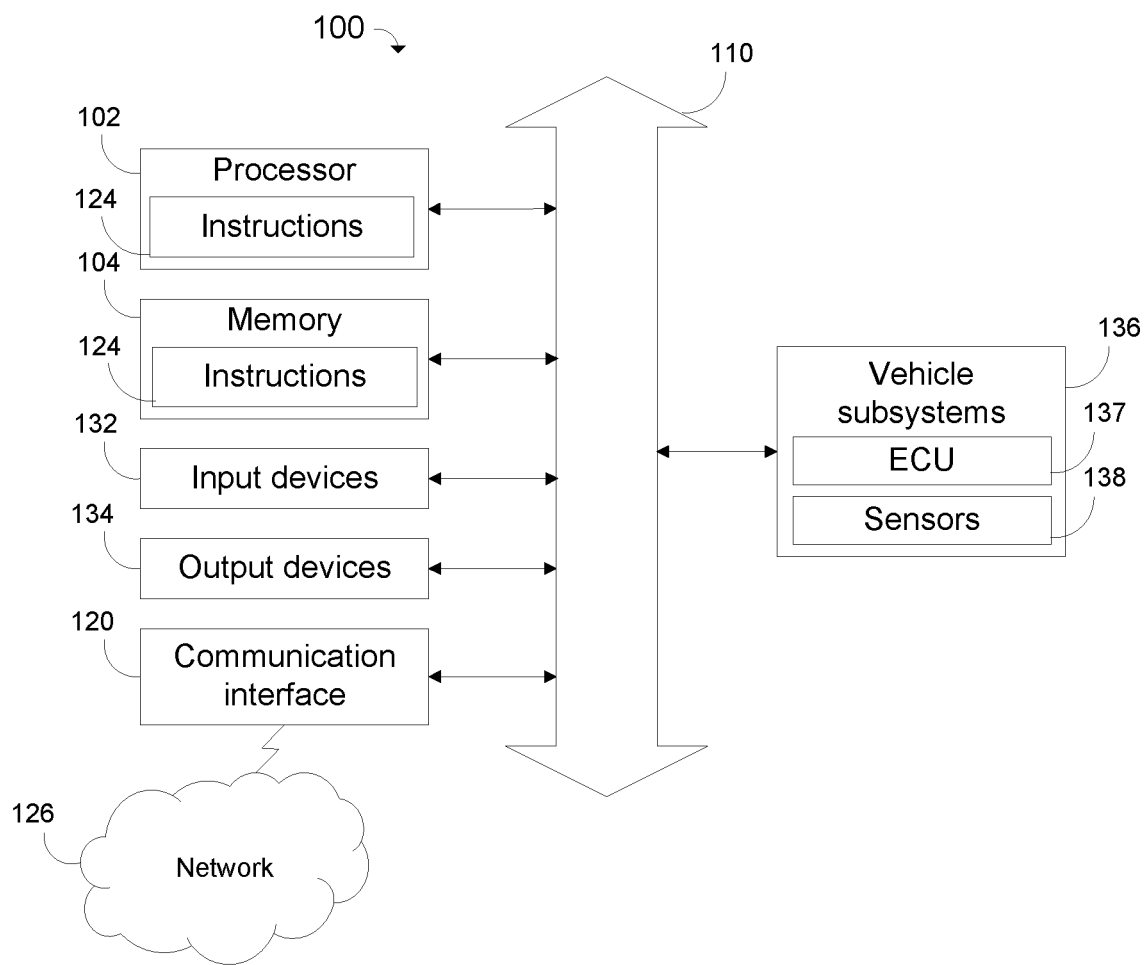
FIG. 1 shows an example electronic device embodying one or more aspects of the predictive failure detection system in accordance with one or more embodiments of the present disclosure.

FIG. 1 is a block diagram of an example electronic device 100 that may include one or more aspects of a predictive failure detection system or method as disclosed herein. The electronic device 100 may include a set of instructions that can be executed to cause the electronic device 100 to perform one or more of the methods or computer based functions disclosed, such as receiving one or more DTCs issued by vehicle subsystems, receiving one or more operating conditions from a plurality of vehicle sensors, comparing the DTC(s) and/or operating conditions(s) to one or more rules or trained model objects, generating a probability of failure based on the DTCs, the operating conditions, and the trained model objects, and issuing a message to an operator based on the probability of failure. The electronic device 100 may operate as a standalone device or may be connected, such as using a network, to other computer systems or peripheral devices. In particular, the electronic device may be a stand-alone device connected to a vehicle, or may be instantiated as computer-readable instructions in preexisting vehicle systems, such as an ECU.

In the example of a networked deployment, the electronic device 100 may operate in the capacity of a server or as a client user computer in a server-client user network environment, as a peer computer system in a peer-to-peer (or distributed) network environment, or in various other ways. The electronic device 100 can also be implemented as, or incorporated into, various electronic devices, such as desktop and laptop computers, hand-held devices such as smartphones and tablet computers, portable media devices such as recording, playing, and gaming devices, automotive electronics such as head units and navigation systems, or other machine capable of executing a set of instructions (sequential or otherwise) that result in actions to be taken by that machine. The electronic device 100 may be implemented using electronic devices that provide voice, audio, video and/or data communication. While a single electronic device 100 is illustrated, the term "device" may include a collection of devices or sub-devices that individually or jointly execute a set, or multiple sets, of instructions to perform one or more electronic functions of the predictive failure detection system, elaborated below in greater detail.

The electronic device 100 may include a processor 102, such as a central processing unit (CPU), a graphics processing unit (GPU), or both. The processor 102 may be a component in a variety of systems. For example, the processor 102 may be part of a head unit or ECU in a vehicle. Also, the processor 102 may include one or more general processors, digital signal processors, application specific integrated circuits, field programmable gate arrays, servers, networks, digital circuits, analog circuits, combinations thereof, or other now known or later developed devices for analyzing and processing data. The processor 102 may implement a software program, such as code generated manually or programmed.

The electronic device 100 may include memory, such as a memory 104 that can communicate via a bus 110. The memory 104 may be or include a main memory, a static memory, or a dynamic memory. The memory 104 may include a non-transitory memory device. The memory 104 may also include computer readable storage media such as various types of volatile and non-volatile storage media including random access memory, read-only memory, programmable read-only memory, electrically programmable read-only memory, electrically erasable read-only memory, flash memory, a magnetic tape or disk, optical media and the like. Also, the memory may include a non-transitory tangible medium upon which software is stored. The software may be electronically stored as an image or in another format (such as through an optical scan), then compiled, or interpreted or otherwise processed.

In one example, the memory 104 includes a cache or random access memory for the processor 102. In alternative examples, the memory 104 may be separate from the processor 102, such as a cache memory of a processor, the system memory, or other memory. The memory 104 may be or include an external storage device or database for storing data. Examples include a hard drive, compact disc ("CD"), digital video disc ("DVD"), memory card, memory stick, floppy disc, universal serial bus ("USB") memory device, or other device operative to store data. For example, the electronic device 100 may also include a disk or optical drive unit. The drive unit may include a computer-readable medium in which one or more sets of software or instructions, such as the instructions 124, can be embedded. The processor 102 and the memory 104 may also include a computer-readable medium with instructions or software.

The memory 104 is operable to store instructions executable by the processor 102. The functions, acts or tasks illustrated in the figures or described may be performed by the programmed processor 102 executing the instructions stored in the memory 104. The functions, acts or tasks may be independent of the particular type of instructions set, storage media, processor or processing strategy and may be performed by software, hardware, integrated circuits, firmware, microcode and the like, operating alone or in combination. Likewise, processing strategies may include multi-processing, multitasking, parallel processing and the like.

The instructions 124 may embody one or more of the methods or logic described herein, including aspects of the electronic device 100 and/or an example predictive failure detection system. The instructions 124 may reside completely, or partially, within the memory 104 or within the processor 102 during execution by the electronic device 100. For example, software aspects of the predictive failure detection system disclosed herein may include examples of the trained model objects, discussed in greater detail below, which may reside completely, or partially, within the memory 104 or within the processor 102 during execution by the electronic device 100.

Further, the electronic device 100 may include a computer-readable medium that includes the instructions 124 or receives and executes the instructions 124 responsive to a propagated signal so that a device connected to a network 126 can communicate voice, video, audio, images or other data over the network 126. The instructions 124 may be transmitted or received over the network 126 via a communication port or interface 120, or using a bus 110. The communication port or interface 120 may be a part of the processor 102 or may be a separate component. The communication port or interface 120 may be created in software or may be a physical connection in hardware. The communication port or interface 120 may be configured to connect with the network 126, external media, one or more input devices 132, one or more output devices 134, one or more vehicle subsystems 136, or other components in the electronic device 100, or combinations thereof. The connection with the network 126 may be a physical connection, such as a wired Ethernet connection or may be established wirelessly. The additional connections with other components of the electronic device 100 may be physical connections or may be established wirelessly. The network 126 may alternatively be directly connected to the bus 110.

The network 126 may include wired networks, wireless networks, Ethernet AVB networks, a CAN bus, a MOST bus, or combinations thereof. The wireless network may be or include a cellular telephone network, an 802.11, 802.16, 802.20, 802.1Q or WiMax network. The wireless network may also include a wireless LAN, implemented via WI-FI or BLUETOOTH technologies. Further, the network 126 may be or include a public network, such as the Internet, a private network, such as an intranet, or combinations thereof, and may utilize a variety of networking protocols now available or later developed including TCP/IP based networking protocols. One or more components of the electronic device 100 may communicate with each other by or through the network 126.

The electronic device 100 may also include one or more input devices 132 configured to allow a user to interact with the components of the electronic device. The one or more input devices 132 may include a keypad, a keyboard, and/or a cursor control device, such as a mouse, or a joystick. Also, the one or more input devices 132 may include a remote control, touchscreen display, or other device operative to interact with the electronic device 100, such as a device operative to act as an interface between the electronic device and one or more users and/or other electronic devices.

The input devices 132 may also include one or more sensors. The one or more sensors may include one or more proximity sensors, motion sensors, or cameras (such as found in a mobile device). Functionally, the one or more sensors may include one or more sensors that detect or measure, motion, temperature, magnetic fields, gravity, humidity, moisture, vibration, pressure, electrical fields, sound, or other physical aspects associate with a potential user or an environment surrounding the user. The input devices 132 may also include one or more cameras configured to capture and generate images. The one or more cameras may be digital cameras or charge-capture devices (CCDs) configured to generate digital images of an environment of electronic device 100. The one or more cameras may comprise optical cameras responsive to visual light, infrared cameras, ultraviolet cameras, or other cameras appropriate to the application.

The electronic device may include one or more output devices 134. The output devices 134 may be configured to display messages, reproduce sounds, illuminate lamps, or take other actions for the purpose of communicating information regarding an internal state of the vehicle and/or electronic device 100 to a user. Output devices may include one or more of a screen, an indicator lamp, a speaker, a haptic feedback device, or other appropriate device. A screen may comprise a touchscreen forming part of an in-vehicle infotainment system, in one example. In another example, the screen may be a separate component from other in-vehicle systems. The screen may be configured to generate a textual or visual message to a user. The speaker may be part of a stereo system or a surround sound system that include one or more audio channels. In particular, speaker may comprise an array of speakers. Speakers may comprise horn driver loudspeakers, electromechanical loudspeakers such as magnet-driver woofers and/or piezoelectric speakers. Indicator lamps may comprise LED or incandescent lamps integrated into one or more vehicle components, such as a check-engine lamp or other appropriate lamp disposed in a dashboard, instrument panel, or other location. Haptic feedback device may comprise a device configured to send a palpable signal to a vehicle component, such as a steering wheel, to communicate a message to an operator. One or more of the output devices 134 may be integrated into or coupled to a vehicle; in other examples, one or more of output devices 134 may form part of a separate mechanical system, such as a smartphone or diagnostic device, communicatively coupled to electronic device 100. For example, the output device may comprise the touchscreen of a smartphone which is wirelessly connected to bus 110, which may comprise a CAN bus, via a wireless connection, such as network connection 126. Still other variations are possible.

Electronic device 100 may include one or more vehicle subsystems 136. Vehicle subsystems 136 may comprise part of a vehicle, and may be communicatively coupled to bus 110, which may comprise a CAN bus in one example. Vehicle subsystems may include one or more elements of a vehicle, and may include, for example, powertrain subsystem, chassis subsystem, body subsystem, and network subsystem, in accordance with the vehicle subsystem categories provided by the OBD-II diagnostic trouble code specifications. In other examples, different subsystem categorization schemes may be used. Vehicle elements may be grouped according to functional, structural, and/or procedural considerations. In one example, vehicle subsystems may include engine systems, fueling systems, evaporative systems, ignition systems, electrical systems, HVAC systems, suspension systems, and so forth.

Vehicle subsystems 136 may include one or more ECU 137 and sensors 138. Non-limiting examples of sensors 138 include MAP/MAF sensors, UEGO, HEGO, temperature sensors, pressure sensors, humidity sensors, engine speed sensors, Hall effect sensor, knock sensor, and others. In some examples, sensors 138 may comprise one or more of input devices 132, discussed above. Sensors may be disposed in engine systems, an intake manifold, exhaust manifold, fuel tank, vehicle tire, coolant passage, EGR passage, vehicle cabin, vehicle body, and other appropriate locations. ECU 137 may be configured to receive signals from one or more of sensors 138. ECU 137 may monitor and evaluate said signals and be configured to output one or more DTCs as conditions warrant. DTCs may be generated according to, for example, OBD-II standards. Additional or alternative standard or proprietary DTC generation schemes may be employed.

Figure 2:
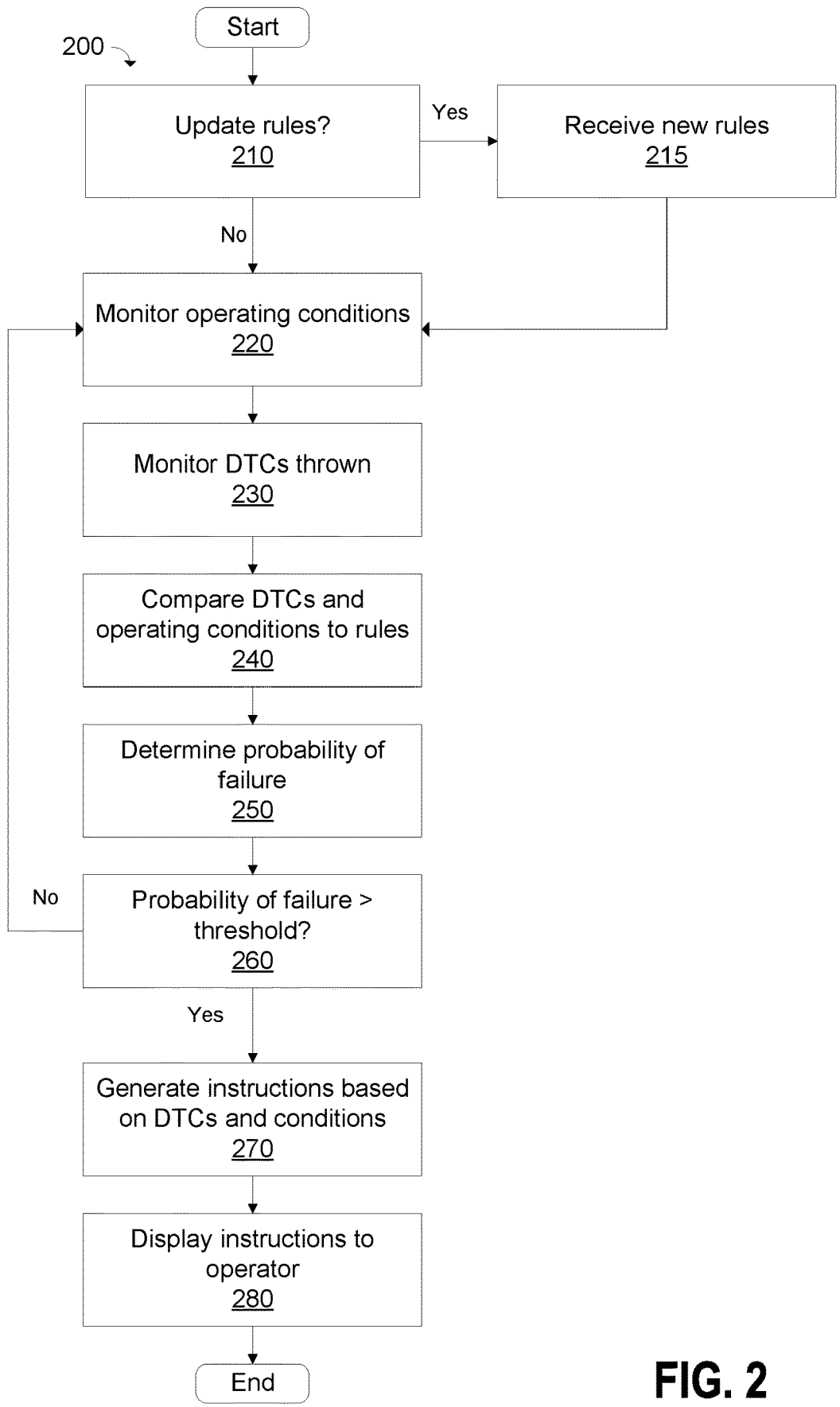
FIG. 2 shows an example method for in-vehicle predictive failure detection.

The electronic device 100 may thus be configured for implement one or more aspects of an in-vehicle predictive failure detection system and/or method. Turning to FIG. 2, an example of a predictive failure detection method is illustrated.

Method 200 begins at 210, where the processor determines whether or not there is a request to update the testing rules used in the method to predict failure. These rules may comprise one or more trained model objects generated by machine learning techniques such as those given in method 300, discussed below. The rules may comprise a set of mathematical and/or statistical relationships, decision trees, data structures, and/or heuristics for determining a probability of failure based on one or more operating conditions, such as DTCs, odometer reading, or battery voltage. The rules may specify instructions or suggested actions to be taken based on the operating conditions. In one example, method 200 may request that the testing rules be updated upon the predictive failure determination system being operated for the first time. In other examples, method 200 may receive a requests for updating the testing rules remotely, for example through a network connection. Alternatively, method 200 may request an update to the testing rules after a predetermined time has elapsed since the previous update; for example, the method may request a rules update once per month, other predetermined interval, or each time the vehicle is started. If an update is requested, processing proceeds to 215. If no update is requested, processing proceeds to 220.

At 215, method 200 proceeds to update the testing rules. This may comprise sending a request for new rules and receiving new rules. The request may be sent to a local or remote server, network, or other data source. The new rules may be received from the same or different source. In one example, the data source may send a complete set of testing rules to replace the current set of testing rules. In another example, the data source may send only rules which are new or changed since the last update request. Once updated rules have been received, processing proceeds to 220.

At 220, the method proceeds to monitor operating conditions. This may include monitoring operating conditions of a vehicle in which electronic device 100 is disposed, for example, including monitoring the signals generated by one or more sensors, such as sensors 138 and/or input devices 132. This may include monitoring an odometer reading and/or a battery voltage signal. Other non-limiting examples of operating conditions which may be monitored and employed in the following processing include engine speed, load, torque request, exhaust temperature, air-fuel ratio, coolant temperature, MAF/MAP, speed, humidity, braking request, ignition timing, valve timing, or other appropriate conditions. Processing then proceeds to 230.

At 230, the method monitors for diagnostic trouble codes. The DTCs may be generated by one or more ECUs 136. The processor may also monitor for an age of the DTCs generated. This may include monitoring for all DTCs or only a subset of DTCs, such as DTCs generated by a particular vehicle subsystem, or DTCs of a particular age. For example, monitoring for DTCs may include only monitoring for DTCs of less than a threshold age. In one example, the threshold age may be a number of days, such as 1 day, 3 days, 5 days, or other appropriate number. In this example, the method may disregard all DTCs which are older than the threshold age. However, it will be appreciated that the method may not disregard any DTCs in some examples, and may use all DTCs generated by the vehicle subsystems in the subsequent processing steps. Processing then proceeds to 240.

At 240, the method includes comparing the DTCs and operating conditions to one or more rules or trained model objects. This may include comparing the DTCs and conditions to one or more statistical or mathematical relationships, decision trees, data structures or other objects. An example of a trained model object may include a rule specifying that if the set of observed DTCs includes {B11FF, U2100}, then the probability of failure is indicated at 80% within the next five days. Trained model objects may include further relationships: continuing with the previous example, the trained model object may include a further rule specifying that the probability of failure increases with mileage in a predictable way, and may specify that the base probability of 80% is modified based on the odometer reading to increase with greater observed odometer readings and decrease with lower odometer readings.

In other examples, the trained model objects may include dynamic rules which can vary in accordance with an operating condition of the vehicle. For example, rules may specify that DTCs {P2459, U0128} indicate a probability of failure of 74%, but that the probability of failure further varies dynamically according to engine load. The probability of failure may increase at higher engine loads and decrease at lower engine loads. The trained model objects may also include rules specifying instructions or recommendations based on the DTCs observed and/or one or more operating conditions, discussed below with reference to block 270. Once the DTCs and operating conditions are compared to the trained model objects and/or rules, processing proceeds to 250.

At 250, the method determines a probability of failure. In one example, this may be accomplished by a straightforward application of one rule or trained model object. Based on the comparisons performed in the previous step, the rule or trained model object may supply a probability of failure. In other examples, more than one rule or trained model object may be employed. For example, if the patterns of DTCs and/or other parameters observed are encompassed by multiple rules, the method may include combining the probabilities in an appropriate manner. For example, the method may select the lowest probability, the highest probability, or some arithmetic combination. In particular, given a plurality of rules $R_1 \ldots R_n$ which provide a plurality of probabilities of failure $P_1 \ldots P_n$, the method may compute an overall probability P of failure according to $$P=1-(1-P_1)(1-P_2) \ldots (1-P_n).$$

After the probability of failure has been determined, processing proceeds to 260.

At 260, the method optionally includes comparing the probability generated previously to a threshold. Alternatively, the threshold comparison may be performed as part of the model generation process, described below with reference to method 300. In particular, at block 350 an optimum cut-off probability may be defined. The procedures discussed below with reference to block 350 may alternatively be performed as part of method 200, at block 260. Thus, at 260 the probability may be compared to a threshold. The threshold may be predetermined and constant, or may be determined based on operating conditions. For example, the method may select a lower probability threshold during high speed and/or load conditions and a higher probability threshold during low speed and/or load conditions. This may allow for dynamic control of the method according to the increased or decreased chance of failure in different driving conditions, for example. As another example, different probability thresholds may be selected according to which vehicle subsystems are involved in the DTCs received by the processor. For example, the method may select a lower probability threshold for DTCs involving engine subsystems and higher probability thresholds for DTCs involving the electrical or HVAC systems. Still other variations are possible. If the probability of failure is determined to be less than the threshold probability, the method returns to 220 and continues to monitor operating conditions and DTCs. If the probability of failure is determined to be greater than the threshold probability, the method proceeds to 270.

At 270, the method generates instructions based on the DTCs, operating conditions and/or trained model objects. The instructions generated may be intended to be delivered to and understood by a human operator. Example instructions may include relatively simple instructions such as "check engine" or "service vehicle soon." In other examples, the method may generate more specific instructions such as "service vehicle within X days," where X is determined based on the DTCs, operating conditions, and/or trained model objects. The instructions may also include "service vehicle as soon as possible." In cases where the method judges a failure is imminent, the instructions generated may include "pull over immediately." The method may additionally or alternatively generate instructions to the operator for specific driving behaviors intended to minimize the likelihood of failure. Non-limiting examples of these kinds of instructions may include "reduce speed" or "turn air conditioner off."

The specific instructions may be generated based on the DTCs, operating conditions, and/or trained model objects. The instructions may also be based on the probability determined above. For example, when the method generates an instruction of "service vehicle within X days," the X may be determined based on the probability. The number of days may be in inverse relationship with the probability, wherein a greater probability of failure corresponds to a fewer number of days and vice versa. Instructions such as "service vehicle as soon as possible" and "pull over immediately" may be generated based on a very high failure probability, such as a failure probability greater than a second threshold, higher than the probability threshold employed in block 260. In some examples, the specific instructions may be included in the trained model objects. For example, a trained model object which diagnoses a fault in the HVAC system based on DTCs generated by the HVAC ECU may include the instruction "turn air conditioner off" when the probability of the fault is greater than a threshold. The method may generate one or more sets of instructions based on the above considerations. After the instructions are generated, processing proceeds to 280.

At 280, the method proceeds by displaying the instructions to the operator. This may be performed using one or more of output devices 134. Instructions may be displayed by illuminating a check engine lamp, by outputting a textual message to a screen, by reproducing an audible message via speakers, or in another appropriate manner. After the instructions have been displayed to the operator, method 200 returns.

Figure 3:
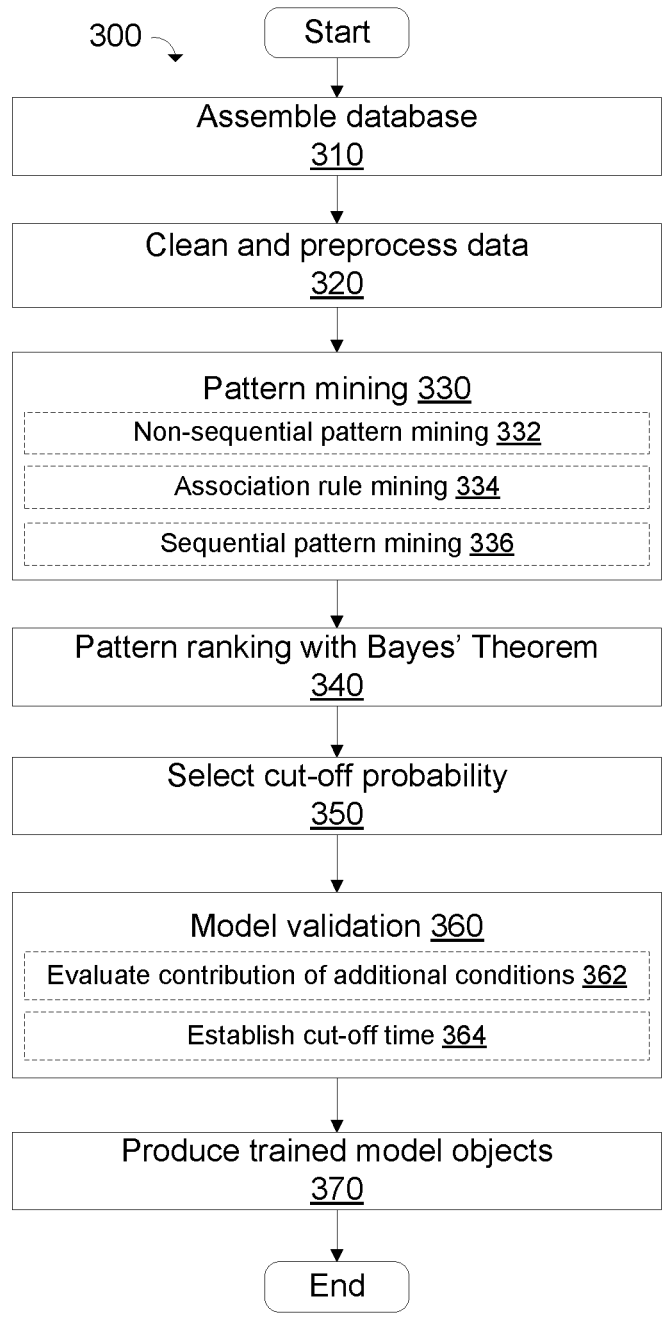
FIG. 3 shows an example method for generating trained model objects for use in in-vehicle predictive failure detection systems and/or methods.

Turning now to FIG. 3, a method 300 is shown for generating trained model objects or rules for use in the in-vehicle predictive failure detection system described above. Method 300 may employ one or more computer learning techniques to generate rules or trained model objects. These rules or trained model objects may be employed or instantiated in electronic device 100 and/or method 200 for use in predictively determining a probability of failure, and/or generating operator instructions. At a high level, the following steps are performed:
1. Data Understanding, Cleaning and Processing
2. Data Storage Strategy to store the data in most optimal manner in Hadoop Map-Reduce Database to facilitate faster model building and data extraction
3. Predictive Power of the DTCs and other derived variables in predicting failures
4. Duration Analysis of DTC data to check for advance notice before actual failure
5. Association Rule Mining to detect DTC Patterns causing failures
6. Rule Ranking Methodology to rank DTC patterns by the associated propensity to cause failures
7. Predictive Models that identify DTC patterns causing failures from training data
8. Model Validation in identifying failure in out of sample data by using Confusion Matrices Based on the method and experiments discussed below, the following results were obtained:
DTCs that lead to Failures more often than Non-Failures can be found with reasonable accuracy and sufficient advance notice before the actual breakdown;
DTC Patterns can be found from data that help predict Failure with accuracy of more than 65% using data at least one day before the actual failure i.e. failures can be predicted at least one day before actual breakdown with accuracy more than 65%;
Addition of more data to the DTC patterns like Odometer and/or Battery Voltage can increase the prediction accuracy of the breakdown up to 75%;
An accuracy of more than 65% is achieved.

The method begins at 310, where an appropriate database is assembled. The database may be assembled from data including DTCs generated by one or more vehicles during a period of time, along with other information such as vehicle model, mileage (odometer reading), battery state of charge, or any other operating conditions measured at the time the DTC was set or at the time the session was initiated, for example. A Vehicle Feedback Database may be used for data extraction. In addition, a session-type flat file may be used to map the session file names to the session types.

A number of queries may be run in order to understand the database thoroughly in consultation with the database user guide. In addition, a data dictionary may be used to understand each field of the DTC data. Queries were run with the following criteria and post processing on the database for final data extraction for analysis:

For DTC (with snapshot) Criteria: June 2014-June 2016 Automated extraction from the website using HTTP calls. Symptoms data available only starting October 2014.

Session Type data was available for all sessions from June 2014-June 2016. Assembling the database further includes sorting session data into failure and non-failure sessions. Failure sessions may include, for example, breakdowns or roadside assistance sessions, whereas non-failure sessions may include, for example, routine maintenance or service. To distinguish Failure and Non-Failure sessions, the following rules may be used:

Failure Sessions are sessions from certain dealerships only

Every other session is a non-breakdown session

Figure 4:
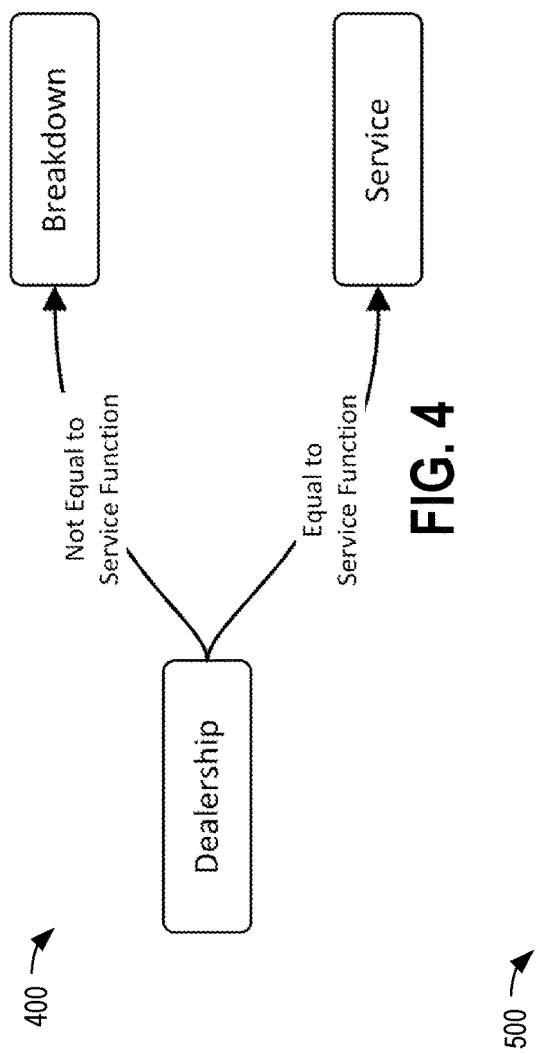
FIG. 4 shows a method for sorting session types into failure and non-failure sessions.

Non-breakdown sessions of 'Service Function' type are treated as Non-Failure sessions An example of this rule is shown by diagram 400 in FIG. 4. Once an appropriate database is assembled, processing proceeds to step 320.

At step 320, the method includes data cleaning and pre-processing. Some issues may be present in the raw data extracted from the database related to duplication and invalid data. Imported data may require cleaning or preprocessing to ensure robust operation of the resulting trained model objects and in-vehicle predictive failure detection system. For example, DTC duplication may be found in some sessions. Duplicate DTCs may be removed using an automated script and only first occurrence of the DTC in the session may be retained so that each DTC occurs only once in a session. Further, some Roadside Assistance sessions are marked as 'Service Function' type, which is not possible. These sessions are removed from the analysis. Processing then proceeds to 330.

Figure 5:
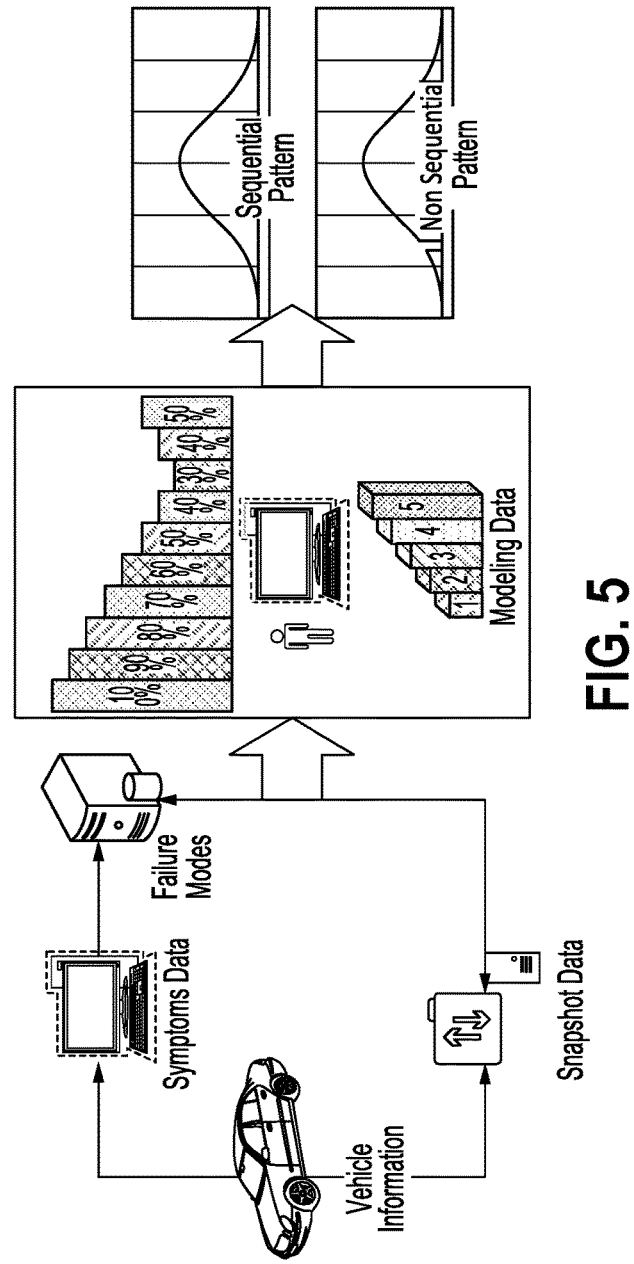
FIG. 5 shows an example pattern mining workflow diagram.

At 330, the method includes performing pattern mining on the assembled database. To check the feasibility of predicting each failure type by sequential and non-sequential pattern-based rule mining, analysis may first be performed on DTCs and Symptoms over one month of data. An example workflow 500 illustrating this process may be seen in FIG. 5.

Non-sequential pattern mining may be performed at 332 as part of pattern mining 330. Non-sequential pattern mining includes the following procedures. The Symptoms data and Snapshot data for 1 month was extracted from Hadoop for May 2016-June 2016 with the certain filter conditions. The total number of Symptoms observed during this period was 1095. Using this data, the top failure modes are classified. The frequency of the failure modes across the 5 symptoms with different levels are estimated using sequence mining and the top failure modes are identified further. The top 5 symptoms paths, with level 4 taken as the cutoff, includes 40% of the total breakdowns, as shown in the following table:

| Symptom Pattern | Cumulative | Frequency | Failure Mode |
|---|---|---|---|
| Electrical -> Instruments -> Warning lamps -> Engine malfunction lamp | 11.9% | 130 | Failure Mode 1 |
| Powertrain -> Engine system -> Engine performance -> Engine speed restricted | 22.1% | 112 | Failure Mode 2 |
| Powertrain -> Engine system -> Engine performance -> Poor acceleration and lack of power | 29.3% | 79 | Failure Mode 3 |
| Electrical -> Instruments -> Information and message center -> Message display area | 34.5% | 57 | Failure Mode 4 |
| Powertrain -> Engine system -> Starting system -> Will not start | 37.7% | 35 | Failure Mode 5 |

As this table illustrates, failure modes beginning with the four categories "Electrical→Instruments→Information and message center→Message display area" account for 57 of the 1095 symptom patterns observed during the test period. Taken together with the previous three symptom paths, these four groups combined comprise 34.5% of all failure modes observed. These identified failure modes are then processed further in a non-sequential pattern mining algorithm.

Pattern mining 330 may also include association rule mining at 334. For association rule mining, the top 5 symptoms paths are identified as the main Failure Modes and the Session File Names corresponding to this Failure Modes are mapped from DTC Snapshot data in order to identify the DTCs leading to the Failure Mode. The DTCs observed are mapped against the session file name and the patterns (sets of DTCs) with high support and confidence are estimated using Associate Rule Mining (ARM). The Failure Mode 2 is caused by B11FF and U2100, here the sequence is not captured. The results of this analysis are given in the following table:

| Rules | LHS | | Number of DTCs | RHS | Support | Confidence | Lift |
|---|---|---|---|---|---|---|---|
| {P0130} => {Failure_Mode_1} | P0130 | | 1 | Failure Mode 1 | 1% | 1.000 | 3.256 |
| {B11FF, U2100} => {Failure_Mode_2} | B11FF | U2100 | 2 | Failure Mode 2 | 2% | 1.000 | 4.191 |
| {P2459, U0128} => {Failure_Mode_3} | P2459 | U0128 | 2 | Failure Mode 3 | 1% | 0.571 | 3.631 |
| {P1889} => {Failure_Mode_4} | P1889 | | 1 | Failure Mode 4 | 1% | 1.000 | 7.880 |
| {B12BE} => {Failure_Mode_5} | B12BE | | 1 | Failure Mode 5 | 1% | 0.500 | 6.156 |

Sequential pattern mining 336 may also be performed as part of pattern mining 330. Sequential pattern mining may be employed on the small dataset to determine if the sequence of DTCs made any difference in the confidence, support, or lift of the rules determined. In sequential rule mining, the DTCs observed are mapped as a time series against the session key and the patterns (sets of DTCs) with high support and confidence are estimated using a Sequential Mining algorithm. The results of sequential rule mining are shown in the following table:

| Rules | LHS | | | # of DTCs | RHS | Support | Confidence | Lift |
|---|---|---|---|---|---|---|---|---|
| <{P0130}> => <{Failure_Mode_1}> | P0130 | | | 1 | Failure Mode 1 | 1% | 1.000 | 3.256 |
| <{U3003}, {B123B}, {U2101}> => <{Failure_Mode_2}> | U3003 | B123B | U2101 | 3 | Failure Mode 2 | 1% | 1.000 | 4.191 |
| <{U0128}, {P2459}> => <{Failure_Mode_3}> | U0128 | P2459 | | 2 | Failure Mode 3 | 1.3% | 0.571 | 3.631 |
| <{P1889}> => <{Failure_Mode_4}> | P1889 | | | 1 | Failure Mode 4 | 1% | 1.000 | 7.880 |
| <{B12BE}> => <{Failure_Mode_5}> | B12BE | | | 1 | Failure Mode 5 | 1% | 0.500 | 6.156 |

For Failure Mode 1, both sequential and non-sequential rules identified P0130 as the DTC causing the failure. Further analysis based on DID was done for the sessions where this DTC occurred to find if there is any indication of failure—i.e. any of the DID values being out of range. However, all DID values were within the High-Low range and therefore, no conclusion could be drawn looking at the DID values alone.

Sequential pattern mining may generate one or more rules or trained model objects (see below) which are dependent on an order or sequence of the DTCs. The rules may differ depending on the order of the DTCs; in some examples, a set of DTCs may generate a first failure probability in a first order, and a second probability in a second order, the second probability different from the first. For example, a set of DTCs comprising two distinct DTCs may generate a first probability in a first order; if the DTCs are detected in a second order different from the first, e.g. the reverse order, then a different sequential rule may be applied which generates a second probability, for example greater than the first probability.

In other examples, sequential rules may provide different instructions to the operator depending on the order of the DTCs. In one example, a set of DTCs in a first order may provide for an instruction of "service vehicle within 5 days," whereas the same set of DTCs in a second, different order may provide for an instruction of "pull over immediately." In another example, a first order of the DTCs may provide for an instruction such as "turn off air conditioner," whereas a second, different order of the DTCs may provide for no instruction at all. Still other variations are possible.

To continue this analysis, the sample size was expanded to include 6 months of data, and only non-sequential pattern mining was performed, as the sequence of DTCs may not be a consideration in this research. Using a larger dataset and similar pattern mining approach as mentioned above was performed to derive non-sequential patterns leading to the failure types. The Symptoms data and Snapshot data were extracted from Hadoop DB from 1 Jan. 2016 to 25 Jun. 2016 with the filter conditions on Market and Dealership; the total number of Symptoms observed was 8376.

The data preparation for non-sequential pattern mining proceeds with classification of Top Failure Modes: The frequency of the failure modes across the 5 symptoms with different levels are estimated using sequence mining and the top failure modes are identified further. The top 6 symptoms paths of the level 4 is taken as the cutoff Each Session file is having the same symptom pattern recorded multiple times. Total Number of Session Files which includes these 6 Symptoms patterns is 3057. These patterns are illustrated in the following table:

| Symptom Pattern | Probability | Frequency | Session Files |
|---|---|---|---|
| Powertrain -> Engine_system -> Engine_performance -> Engine_speed_restricted | 12.21% | 1023 | 828 |
| Electrical -> Instruments -> Warning_lamps -> Engine_malfunction_lamp | 11.40% | 955 | 915 |
| Powertrain -> Engine_system -> Engine_performance -> Poor_acceleration_and_lack_of_power | 5.86% | 491 | 400 |
| Electrical -> Instruments -> Information_and_message_center -> Message_display_area | 4.44% | 372 | 342 |
| Powertrain -> Engine_system -> Starting_system -> Will_not_start | 3.99% | 334 | 303 |
| Electrical -> Battery -> Charging_system -> Flat_battery | 3.44% | 288 | 269 |

The method then performs non-sequential DTC pattern mining on the prepared data. The top 6 symptoms paths are identified as the main Failure Modes and the Session File Names corresponding to this Failure Modes are mapped from DTC Snapshot data in order to identify the DTCs leading to the Failure Mode. Out of 3057 session files from top 6 symptom patterns only 2850 are observed because the other session files are not recorded in DTC snapshot data. Total number of sessions where Non Failure Mode occurred is 38899. The DTCs occurred are mapped against the session file name and the patterns (set of DTCs) with high support and confidence are estimated using Associate Rule Mining (ARM). The Failure Mode 2, 3 and 4 are not observed because the support of the DTCs leading to these failure modes is less than 0.05%. The results of non-sequential pattern mining are summarized in the following table:

| Rules | Support Failure | Sessions | Confidence | Lift | Support NF | Sessions | F NF comparison |
|---|---|---|---|---|---|---|---|
| {B10AD, B1403, P006A, P0460} => {Failure_Mode_1} | 0.56% | 16 | 51.6% | 1.91 | 0.01% | 5 | 42.68 |
| {B100A, B10AD, B1403, P006A, P0460} => {Failure_Mode_1} | 0.56% | 16 | 51.6% | 1.91 | 0.01% | 5 | 42.68 |
| {B10AD, B1403, P006A} => {Failure_Mode_1} | 0.67% | 19 | 54.3% | 2.01 | 0.02% | 6 | 42.22 |
| {B100A, B10AD, B1403, P006A} => {Failure_Mode_1} | 0.63% | 18 | 52.9% | 1.96 | 0.02% | 6 | 39.95 |
| {B100A, P0087, P0460} => {Failure_Mode_2} | 0.70% | 20 | 52.6% | 1.79 | 0.02% | 8 | 33.12 |
| {P0087, P0460} => {Failure_Mode_2} | 0.84% | 24 | 55.8% | 1.89 | 0.03% | 13 | 24.20 |
| {C0064, P1674, U0291} => {Failure_Mode_6} | 0.63% | 18 | 90.0% | 9.87 | 0.03% | 10 | 23.57 |
| {B1304, C0064, P1674, U0291} => {Failure_Mode_6} | 0.63% | 18 | 90.0% | 9.87 | 0.03% | 10 | 23.57 |
| {C0064, P1674, U0291, U3001} => {Failure_Mode_6} | 0.63% | 18 | 90.0% | 9.87 | 0.03% | 10 | 23.57 |

The above table illustrates the results of the rule mining—specifically the last column compares the support for the same rule causing failure sessions as well as non-failure sessions. This motivates the derivation of a method of ranking the rules where the same rule can be occurring in both failure as well as non-failure sessions, so as to identify rules having more propensity to cause failures than non-failures.

Based on this analysis, suggested next steps were: group all Failure Types into a single mode; derive a single confidence measure combining failure and non-failure modes for comparing rules and ranking them according to the associated propensity of the rules to cause failures; use the module name in the Full DTC—i.e. Full DTC=Module-DTC-Type Description. In light of these considerations, Bayes' Rule may be applied. After non-sequential pattern mining is complete, processing proceeds to 340.

At 340, the method includes pattern ranking using Bayes' Theorem. In order to rank the patterns derived from non-sequential pattern mining by the associated importance (e.g., relative likelihood) in causing failures, Bayes' Theorem is used. Patterns are ranked by the conditional probability of failure given that the pattern has occurred:

$$Pr(F \mid P_1) = \frac{Pr(F) \cdot Pr(P_1 \mid F)}{Pr(F) \cdot Pr(P_1 \mid F) + Pr(NF) \cdot Pr(P_1 \mid NF)}$$

This equation estimates the probability of Failure F given that the pattern P1 has occurred in a session—which is the proportion of the support of P1 to cause failure in the total support of P1.

Each term in this method is interpreted and derived as follows:
- Pr(F)—Failure probability of population. This was estimated using the Sales data from January 2013-June 2016 to get the number of vehicles that have Roadside Assistance facility (for 3 years) and the actual number of failures observed for the period January 2016-June 2016. Example for the period January 2016-June 2016: Pr(F)=(Number of Failure Sessions)/(Total Sales from January 2013-June 2016)
- Pr(NF)—Non-failure probability of population, which is 1−Pr(F) as F & NF are mutually exclusive
- Pr(P1|F)—Conditional Probability of Pattern P1 leading to Failure: Pr(P1|F)=(Number of Failure sessions containing pattern P1)/(Total Number of Failure Sessions)
- Pr(P1|NF)—Conditional Probability of Pattern P1 leading to Non-Failure:
- Pr(P1|NF)=(Number of Non-Failure sessions containing pattern P1)/(Total Number of Non-Failure Sessions)

Figure 6A:
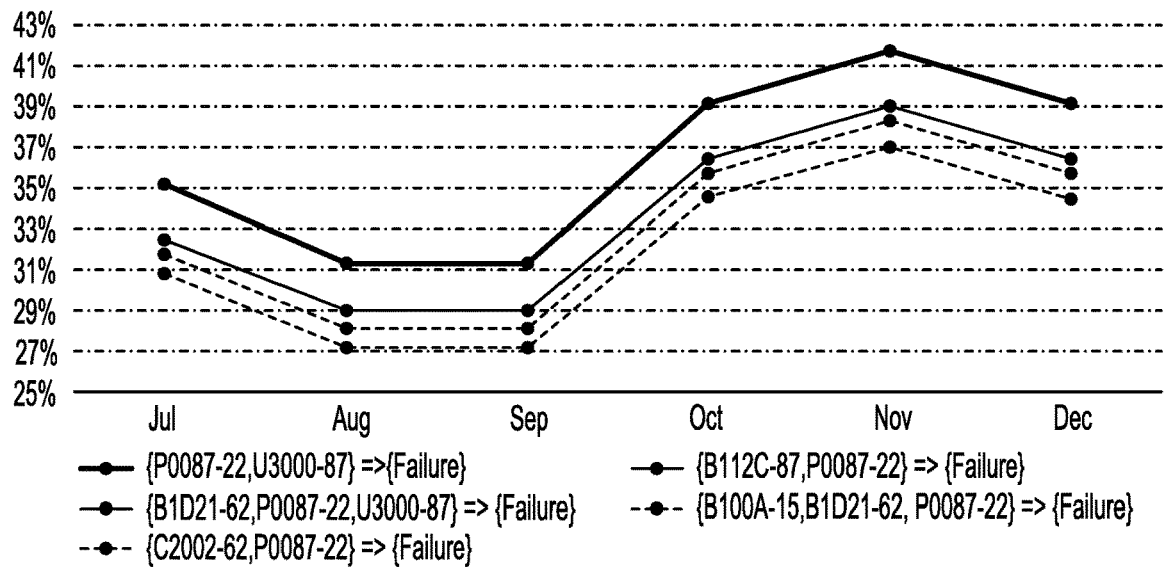
FIGS. 6A and 6B show the propensity for failure of the top 5 identified symptom patterns according to pattern ranking with Bayes' Theorem, in the intervals July 2015-December 2015 and January 2016-June 2016, respectively.
Figure 6B:
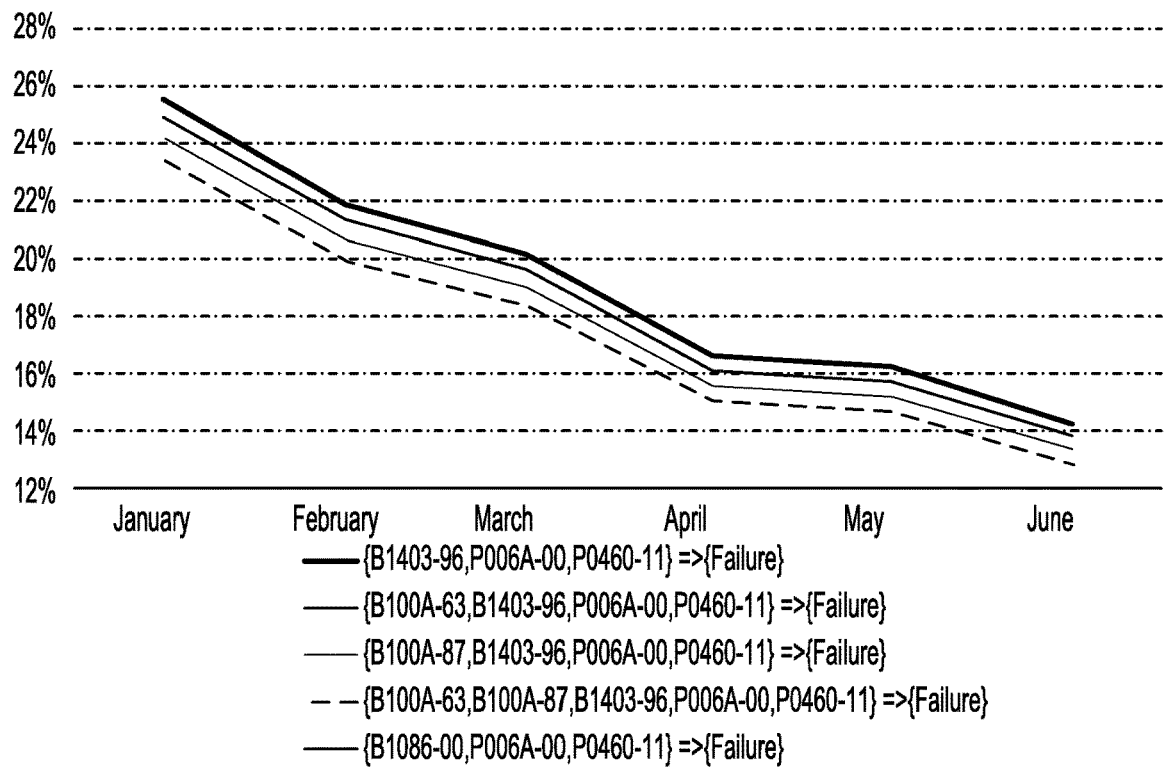

FIGS. 6A and 6B show the results of pattern ranking with Bayes' theorem. FIG. 6A shows a chart 600a of the top 5 patterns' propensity for failure during the interval July 2015-December 2015. FIG. 6B shows a chart 600b of the top 5 patterns' propensity for failure during the interval January 2016-June 2016.

A new method to validate the model using Rules derived from training the model on out of sample data may be developed by extending the pattern ranking mechanism based on Bayes' rule:

$$Pr(F \mid DTC)_v = \frac{Pr(F) \cdot Pr(DTC \mid F)_t}{Pr(F) \cdot Pr(DTC \mid F)_t + Pr(NF) \cdot Pr(DTC \mid NF)_t}$$

- Pr(F|DTC)v=Probability of Vehicle Failure of the Validation session given a pattern has been detected, DTC
- Pr(F)=Probability of Vehicle Failure
- Pr(NF)=1−Pr(F)=Probability of Vehicle Not Failing, i.e. not breaking down
- Pr(DTC|F)t=Probability of seeing pattern DTC given that the vehicle has failed in Failure Training Data
- Pr(DTC|NF)t=Probability of seeing pattern DTC given that the vehicle has NOT failed in Non Failure Training Data The above calculations may be used to estimate the conditional probability of Failure in the validation set (out-ofsample) from the a priori probabilities estimated from the training set. After pattern ranking with Bayes' Theorem is complete, the method proceeds to 350.

At 350, the method proceeds to select a cut-off probability. The cut-off probability may be a threshold probability value, wherein if a determined probability of failure is above the threshold, potential failure is indicated to an operator, whereas if the determined probability of failure is below the threshold, potential failure may not be indicated to the operator. Additionally or alternatively, this may occur as part of method 200, for example, in blocks 260-280. This may include selecting a probability locally or non-locally in the in-vehicle predictive failure detection system, may include a plurality of different thresholds, and/or may include issuing instructions to an operator based on or as a function of a probability of failure. These functions may be included in, for example, block 260 of method 200, as discussed above. However, in other examples, selection of an appropriate probability cut-off threshold may be performed as part of method 300, at 350.

Figure 7:
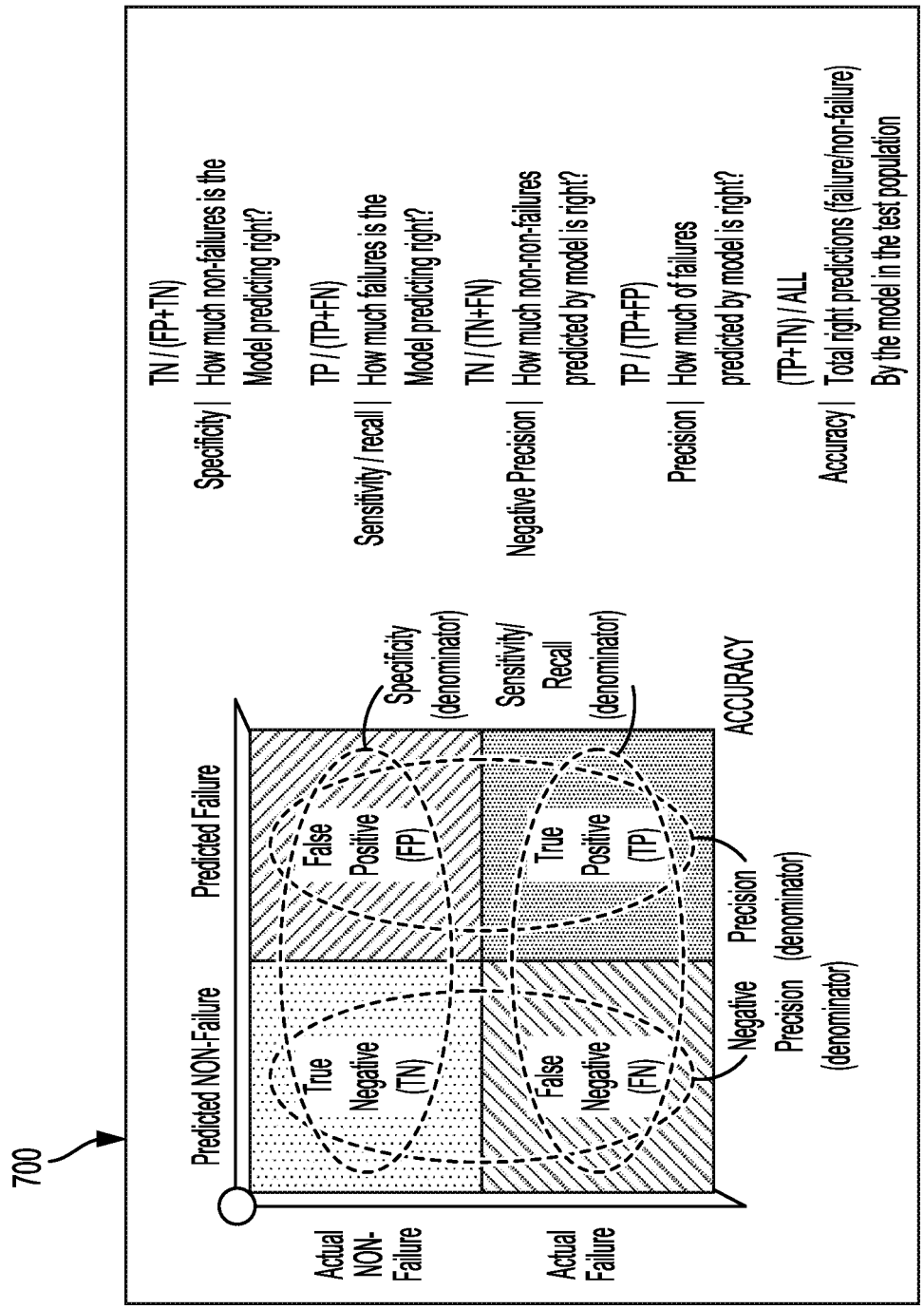
FIG. 7 shows a sensitivity and specificity diagram.

To identify a session as failure or non-failure, the cutoff probability is derived by using the DTC Pattern Probability of both Failure and Non-Failure sessions. This process includes creating, for each session in training set containing {DTCi}, i=1 . . . n, all possible patterns of DTC (i.e. the power set of {DTCi}). Then, for each y in P, Pr(F|y) is estimated using Bayes theorem as discussed above. The pattern y having the highest Py=Pr(F|y) is then identified as the pattern actually causing the failure. The Sensitivity and Specificity curves for each $P_y$ from different sessions are then estimated. See FIG. 7 for an illustration 700 of sensitivity and specificity. The Failure cutoff probability will be intersection of these two curves (sensitivity and specificity curves) and this intersection point will give highest overall classification for Failure as well as Non-Failure sessions.

Figure 8:
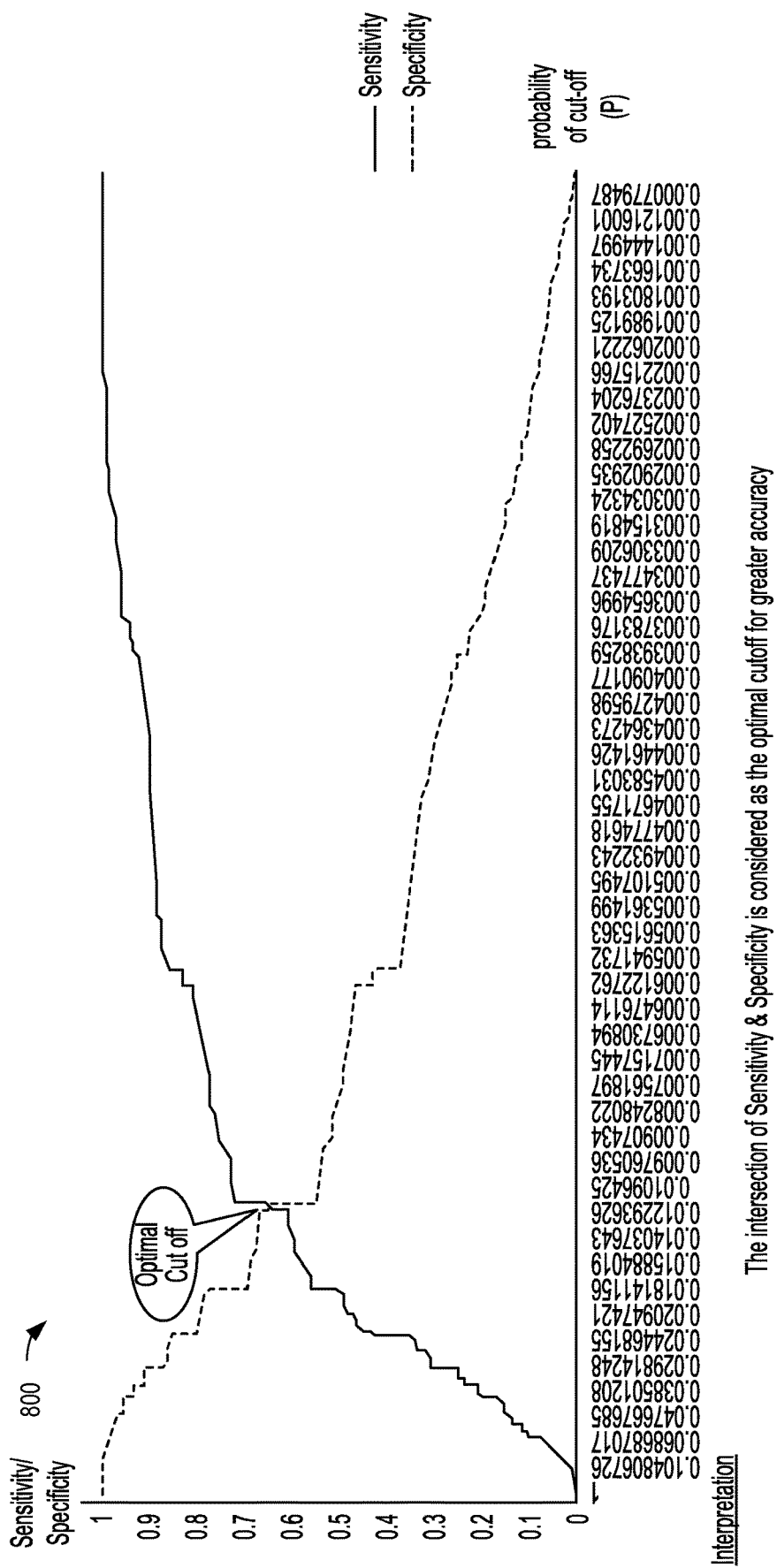
FIG. 8 shows example sensitivity and specificity curves according to one example.

In order to use the cut-off probability for classification (during validation, discussed below), the following rule is observed: for each session in the validation set, the $P_y$ is estimated as discussed above. If $P_y$ is greater than or equal to cut-off probability the session is classified as Failure and Non-Failure otherwise As an example of this procedure, one session file is considered: The DTCs observed for the session file are ABS-U3006-16, PCM-P0504-62, PCM-P2263-22, PCM-P253F-00. Failure Probability of different combinations of patterns within the DTCs observed in the sessions are calculated and sorted by decreasing order by plugging in P(F)=0.002854989, P(NF)=1−P(F)=0.997145011. The maximum probability observed is considered for predicting whether the session is Failure or Non-Failure excluding the 100% Probability therefore, here the highest probability for {ABS-U3006-16, PCM-P2263-22}=2.71% will be used to train for the failure sessions. Similar procedure is repeated for each session in the training dataset. FIG. 8 shows a graph 800 of the Sensitivity and Specificity curves plotted from this example.

Figure 9:
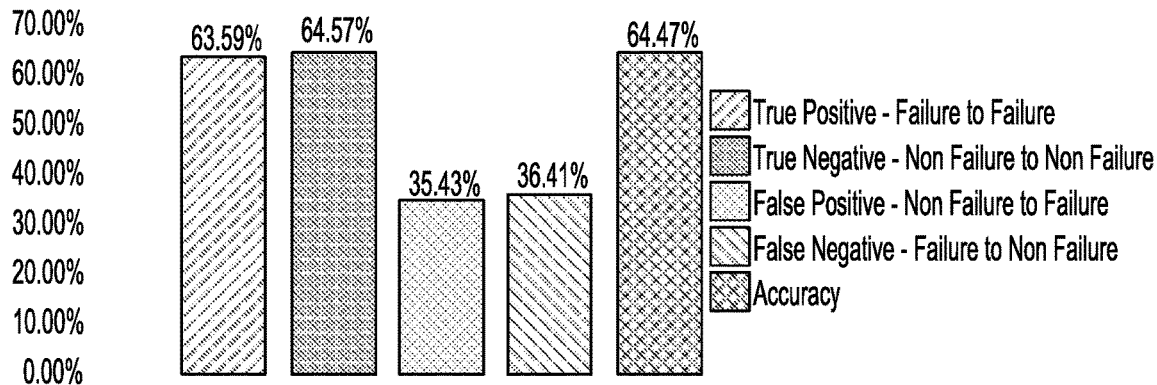
FIG. 9 shows model performance metrics according to a given probability cut-off.
Figure 10:
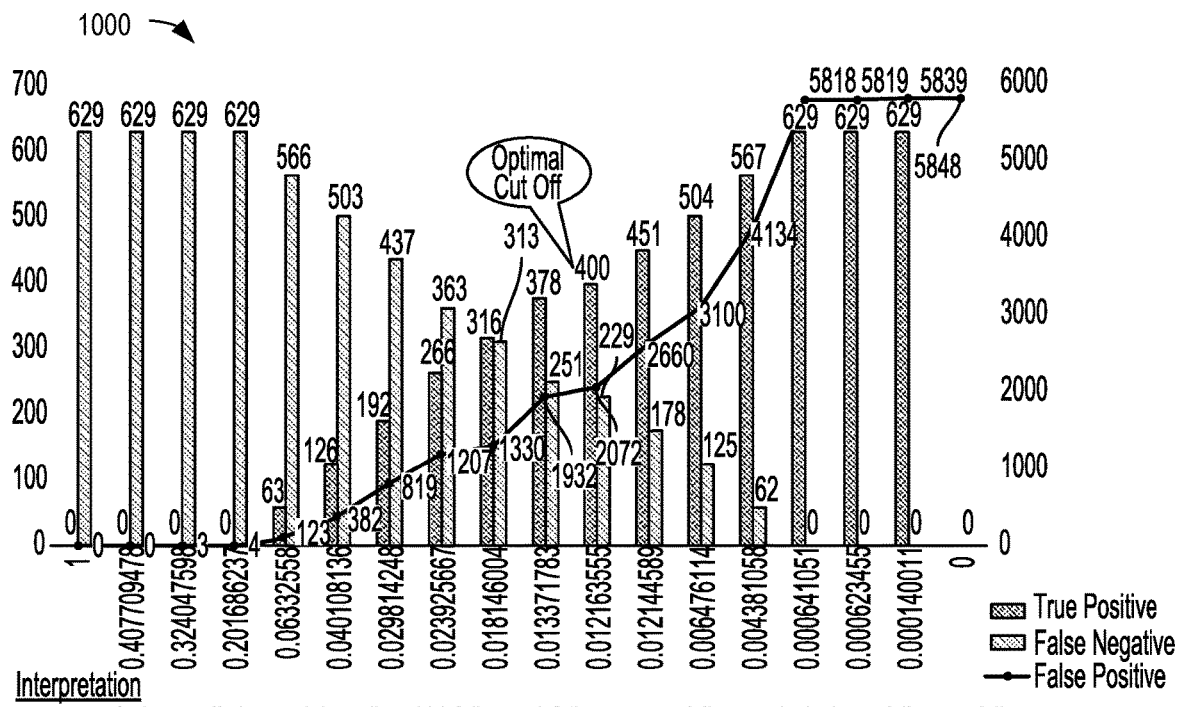
FIG. 10 shows a trade-off in true positive rates at different probability cut-off values.

In FIG. 8, the two curves intersect at x-value of 0.0121635 which is the optimal cutoff to be used. A session is classified as failure if the P(F|DTC) is greater than the cutoff probability and non-failure otherwise. Based on the cutoff of 0.0121635, the Validation Results give overall accuracy of 64.47%, as illustrated in chart 900 of FIG. 9. The tradeoff in the true positive rates at different cut-off values is illustrated in chart 1000 of FIG. 10. After the cutoff probability is selected, the method proceeds to 360.

At 360, model validation is performed. Model validation may include evaluating the contribution of additional conditions, such as battery voltage and odometer reading, to the likelihood of failure, as in block 362. Using all sessions for one vehicle model, 12 different models were built for combinations resulting from:

3 DTC Patterns–{Full DTC, Full DTC+Odometer+# DTCs, Full DTC+Odometer+# DTCs+Battery Voltage}

4 Times to Failure–{Last DTC, 1 day from Last DTC, 3 days from Last DTC, 5 days from Last DTC}

Figure 11:
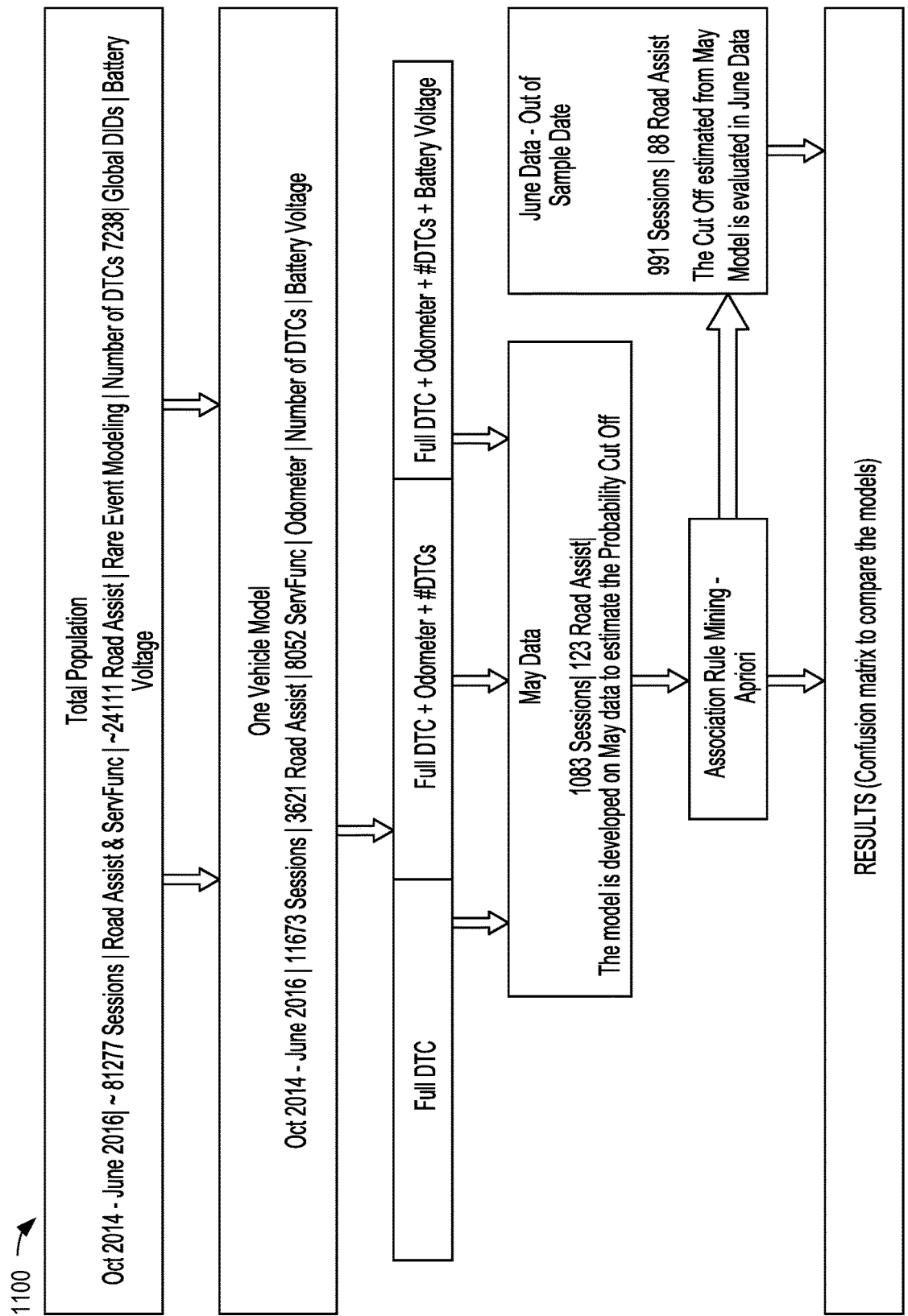
FIG. 11 shows a diagram of an example data preparation workflow for model validation.

The data preparation and workflow for model validation are illustrated in diagram 1100 of FIG. 11.

Missing values in the dataset may be treated according to an appropriate procedure. Approximately 25% of the DTCs don't have battery voltage filled. These are considered as a separate "NA" category. The total distance recorded for each session is considered as the Odometer reading for that session. If in case the total distance is 'zero' the maximum value of that parameter for that session is considered as the Odometer reading as a missing value treatment.

Continuous variables such as Battery Voltage, Odometer and # DTCs are binned for use in the following processing. A decision tree, such as the example tree 1200 shown in FIG. 12, may be used for data binning. Finally, each DTC in the session is converted into Module Name-DTC-TypeDesc-Odometer Bin-Battery Voltage Bin-Number of DTCs Bin as input for the modeling stage.

Figures 12, 13:
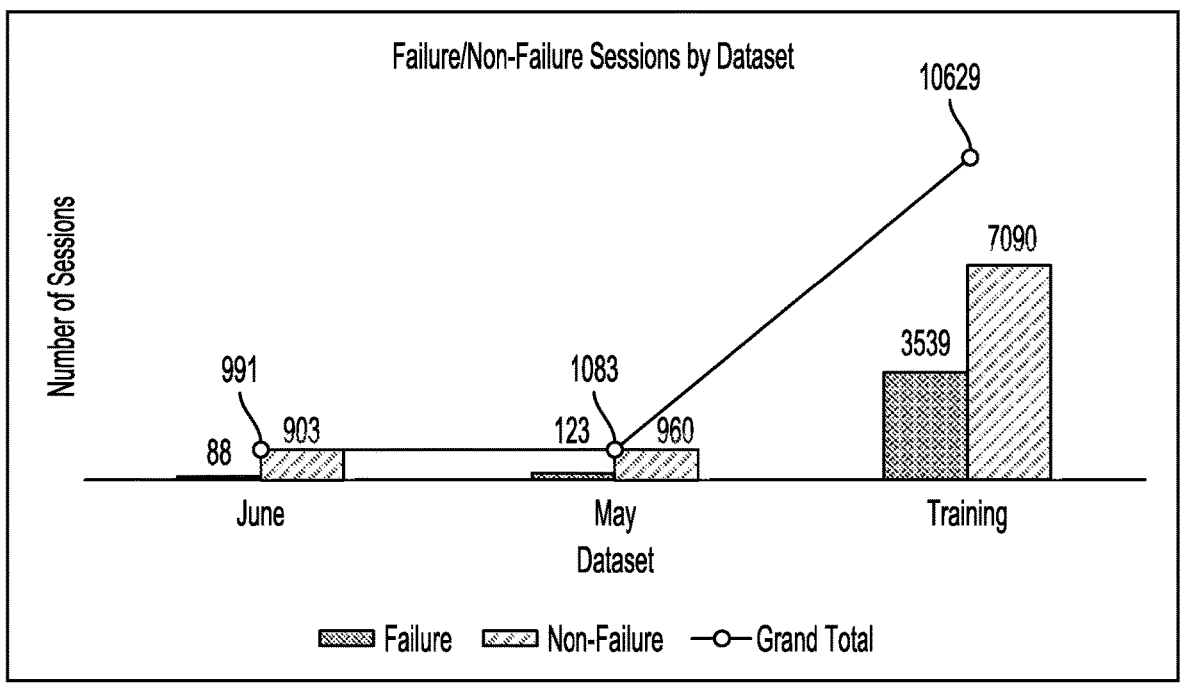
FIG. 12 shows an example data binning decision tree.
FIG. 13 shows distribution of failure and non-failure modes in different datasets.
Figure 14:
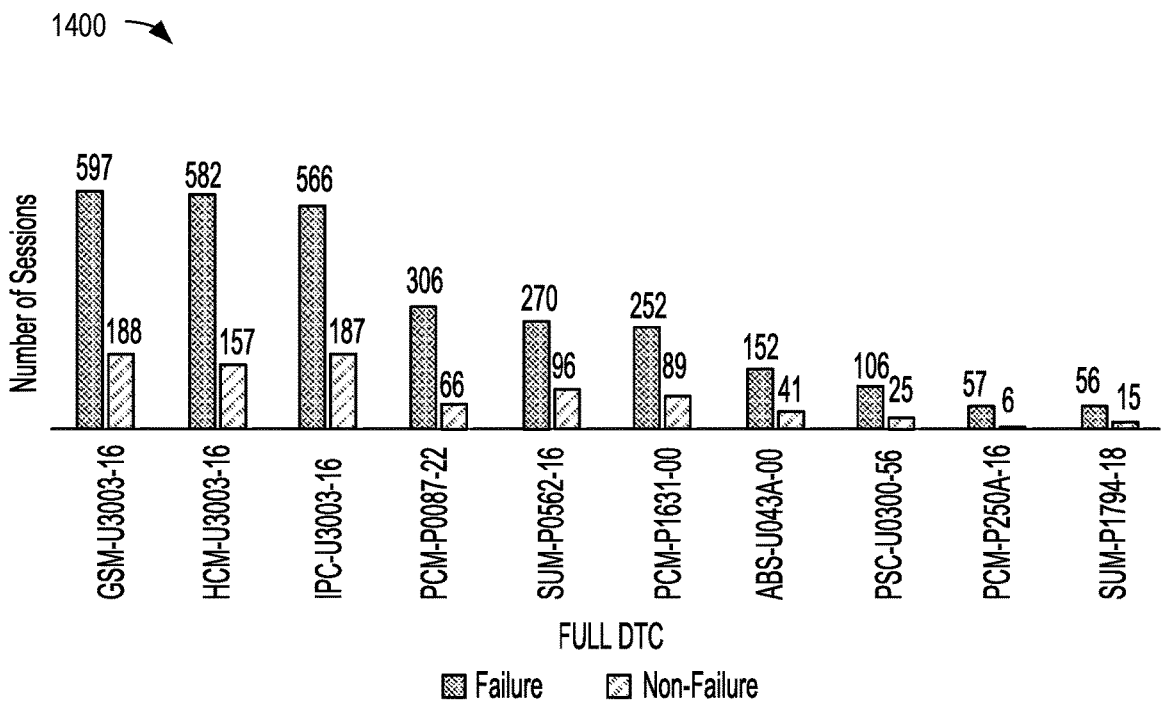
FIG. 14 shows most frequent DTCs of failure sessions.
Figure 15:
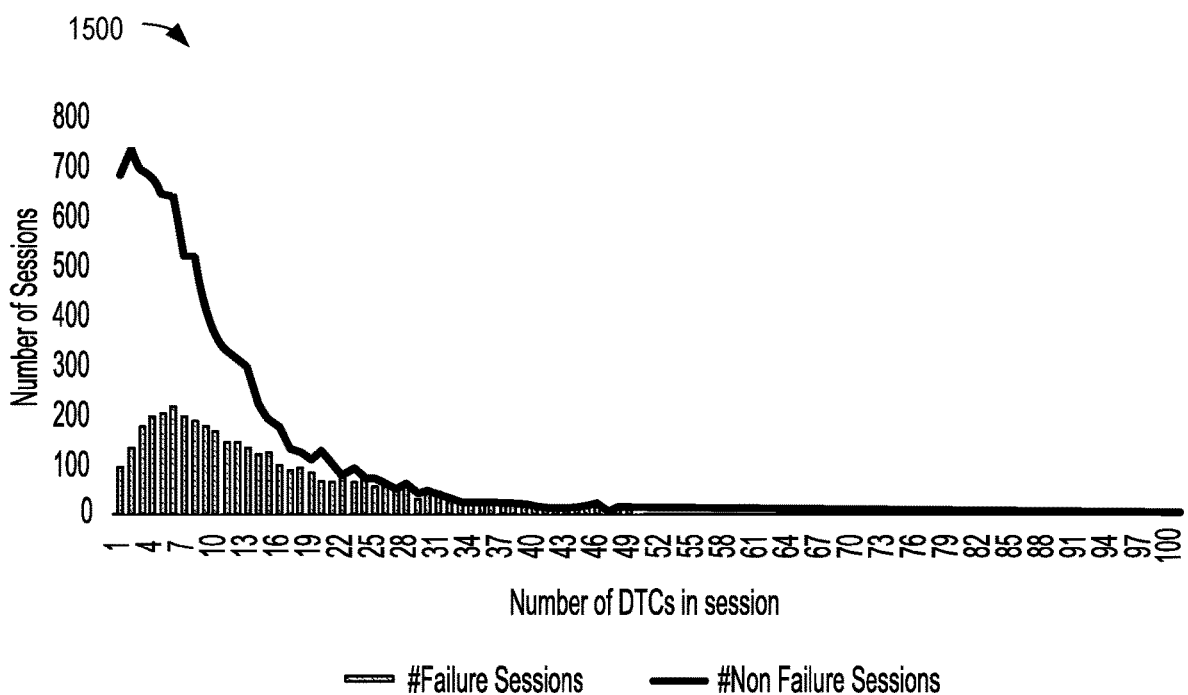
FIG. 15 shows frequency of failure vs. non-failure sessions by number of DTCs.
Figure 16:
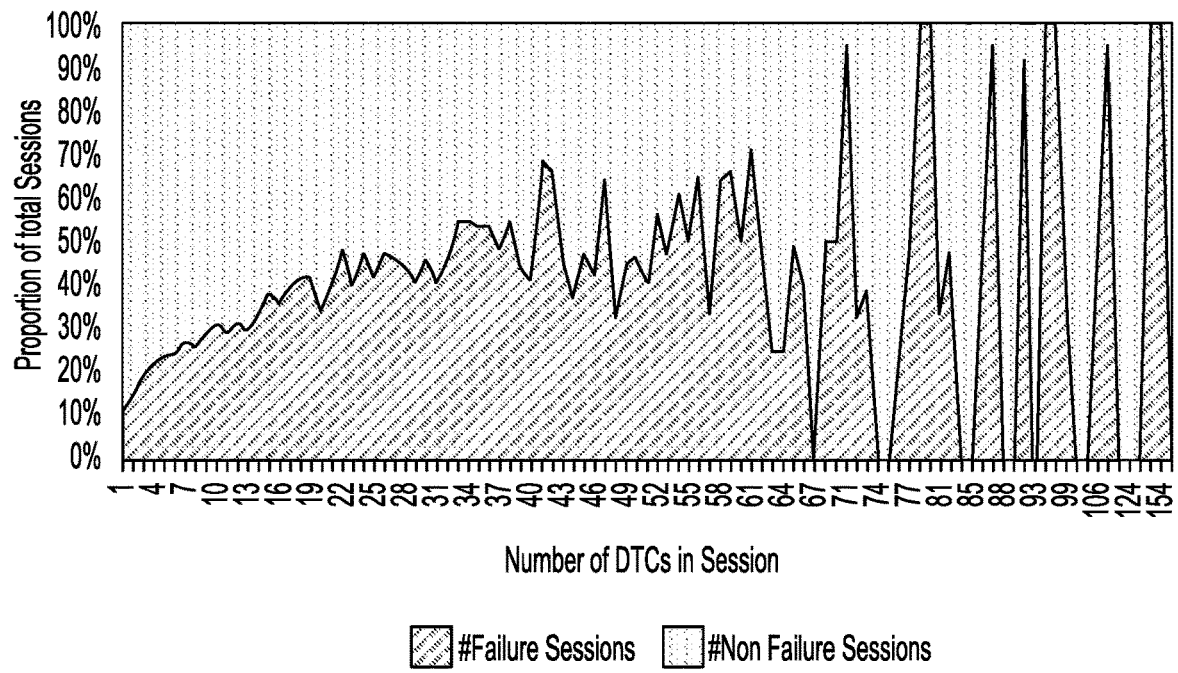
FIG. 16 shows failure proportion by number of DTCs in a session.

The results of model validation are shown in the following figures. Breakup of Failure vs Non-Failure sessions in Training (October 2014-April 2016), Testing (May 2016) and Validation (June 2016) data 1300 is shown in FIG. 13. Frequency count of Top DTCs in Failure sessions is shown in chart 1400 of FIG. 14. Frequency count of sessions by # DTCs in the session is shown in graph 1500 of FIG. 15. As the # DTCs in session increase, the probability that the session is a failure session increases, as shown in graph 1600 of FIG. 16.

Figure 17:
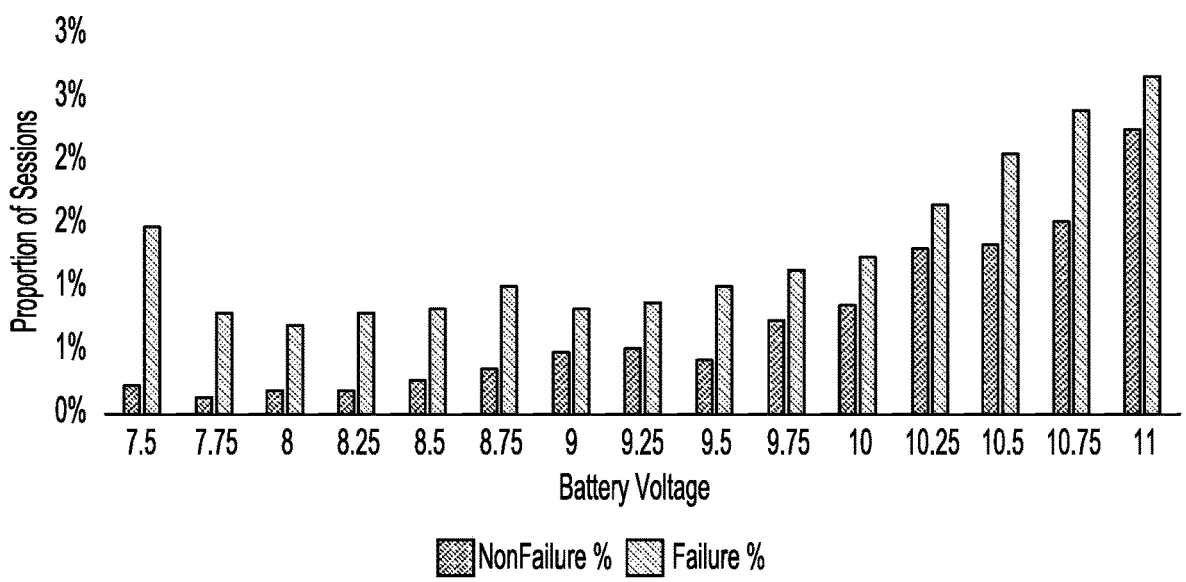
FIG. 17 shows battery voltage distribution for failure and non-failure sessions.

Ratio of the proportions of failure and non-failure sessions is inversely correlated with Battery voltage—the ratio is higher at lower battery voltage which indicates that at lower battery voltages there are more chances of finding a Failure session than a Non-Failure session. This is illustrated in chart 1700 of FIG. 17.

During model validation, Association Rules between Failures and combinations of the input variables were derived for:

Full DTC–Module+DTC+Type Description
Odometer reading
Number of DTCs
Battery Voltage The effect of different day cutoffs was also investigated, as at block 364—i.e. using data up to Last DTC, 1 day, 3 days, 5 days before the Last DTC occurred. This is shown in the following table:

| Cutoff | #DTCs (Not Unique) | % of Last DTC |
| --- | --- | --- |
| Last DTC | 153279 | 100% |
| 1 Day | 135255 | 88% |
| 3 Days | 131842 | 86% |
| 5 Days | 129864 | 85% |

Figure 18A:
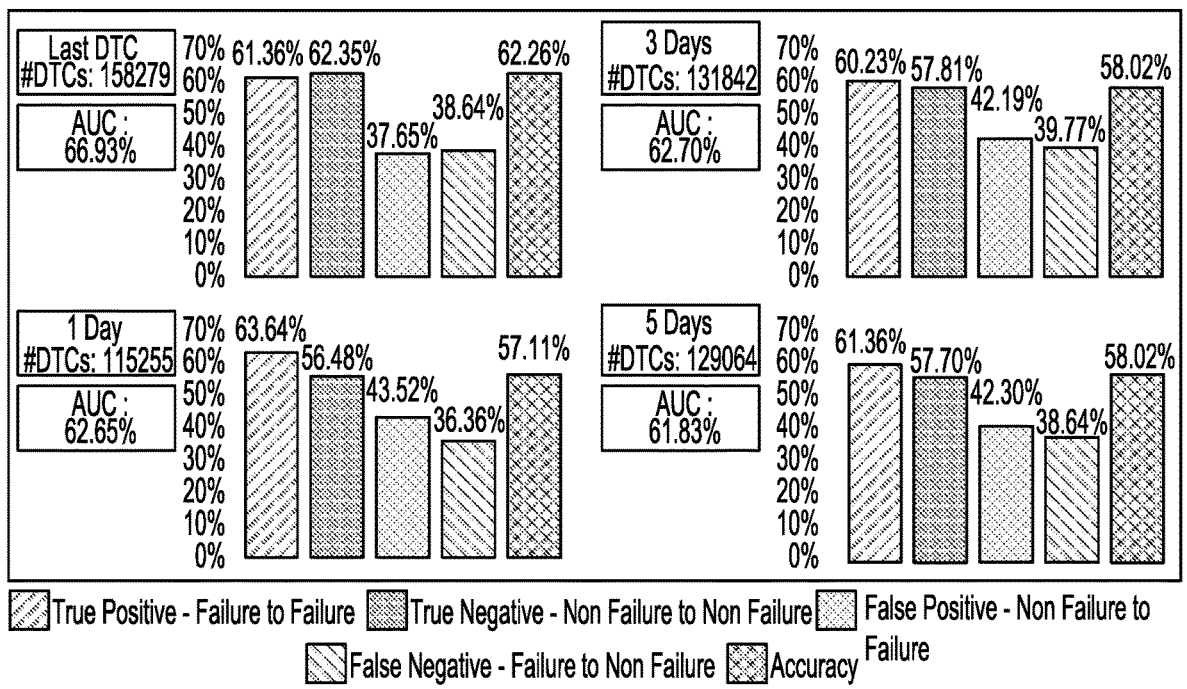
FIGS. 18A-D show model accuracy results using different input parameters.

Model validation results using cutoffs of Last DTC, 1 day, 3 days and 5 days show that the overall accuracy decreases as the cutoff increases due to lesser availability of data as the cutoff time period increases. This is illustrated in chart 1800*a* of FIG. 18A.

Figure 18B:
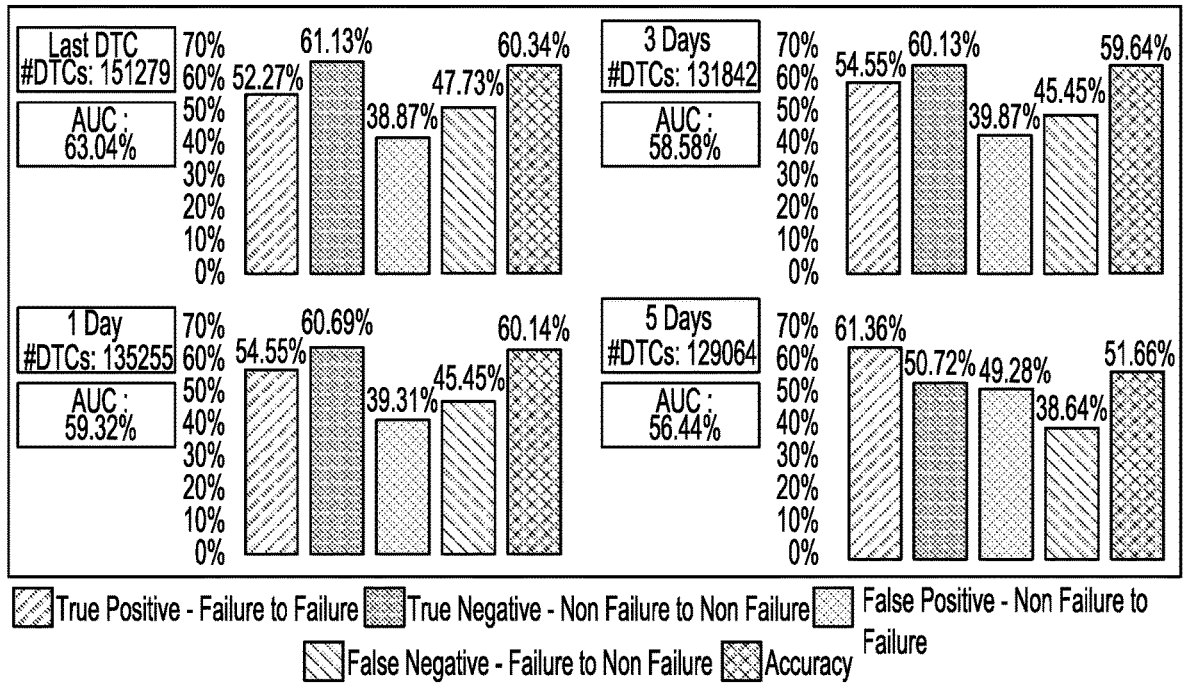

A similar but more consistent decrease in accuracy is found when using Full DTC, Odometer reading, and number of DTCs combination as input for the model for the model. These results are summarized in chart 1800*b* of FIG. 18B.

Figure 18C:
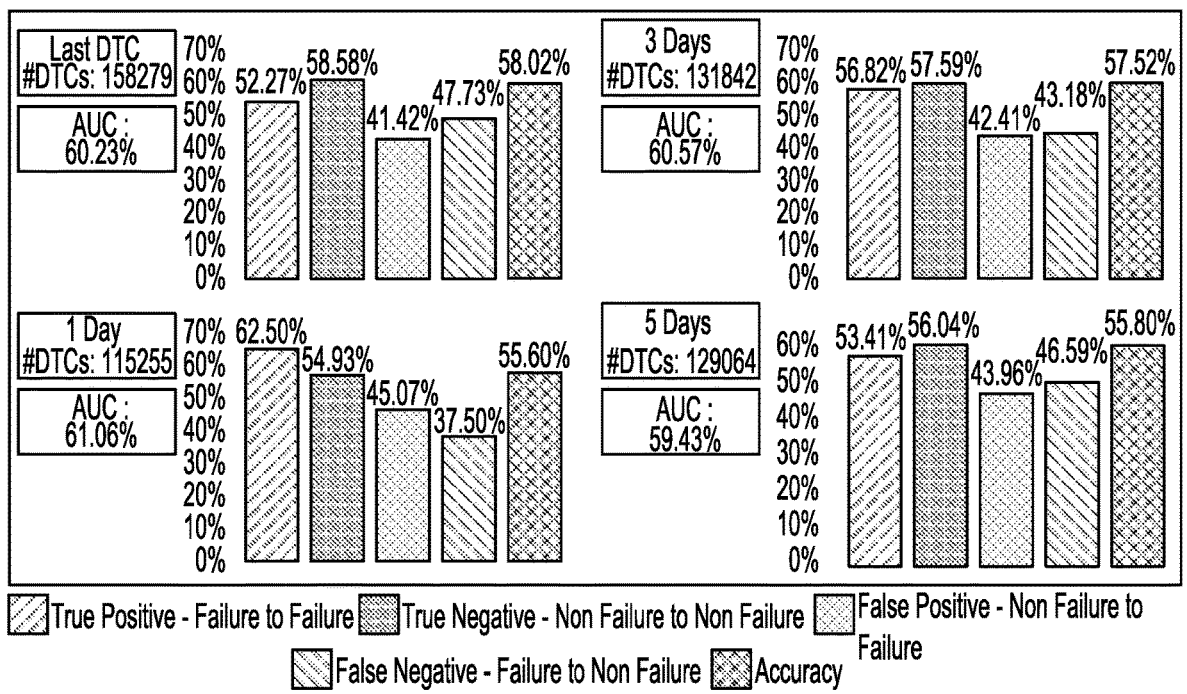

When using the feature combination Full DTC, odometer reading, number of DTCs, and battery voltage, it was found that the inclusion of battery voltage actually decreased the overall accuracy due to the skewed accuracy from Non-Available Battery voltage sessions. This is shown in chart 1800*c* of FIG. 18C.

Figure 18D:
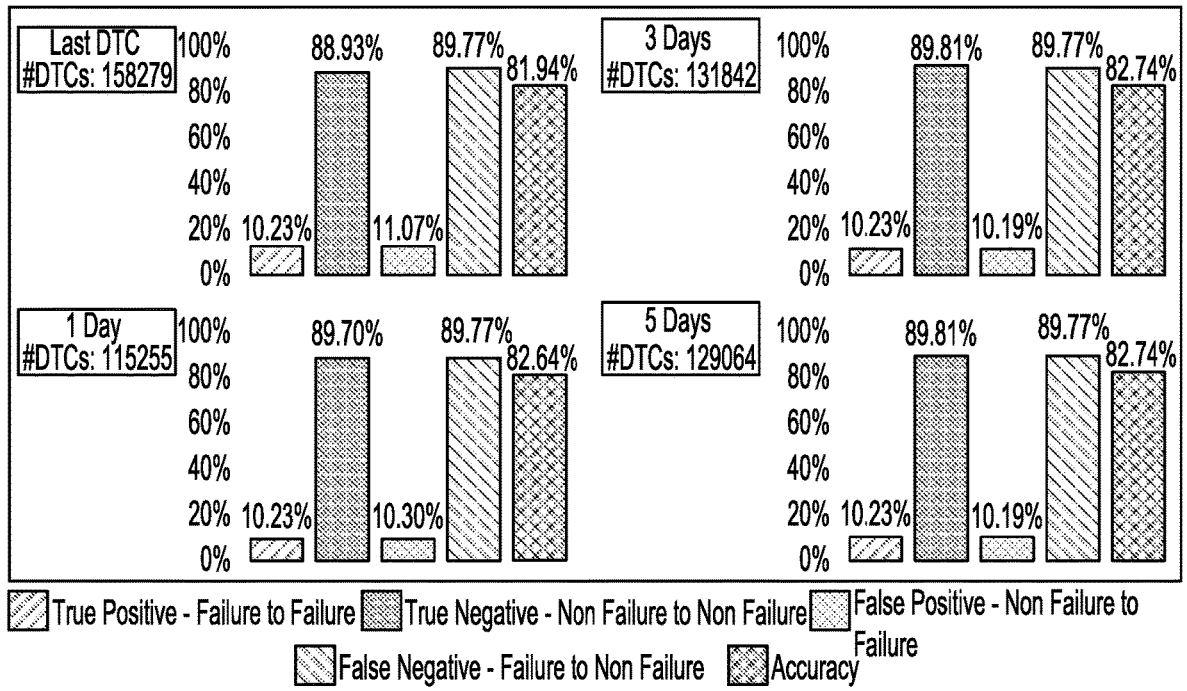

Using battery voltage only gives results which are heavily skewed towards the True Negative cases but performs poorly on True Positive cases—i.e. predicts the Non-Failure cases accurately but very low accuracy in predicting actual Failures. This is shown in chart 1800*d* of FIG. 18D. (Note: For this result the Minimum Battery voltage of the session was used as the dependent variable to predict Failure)

From all the combinations of results the Model Results using Full DTC+Odometer+# DTCs and a one-day cutoff appears to be optimal with sufficient advance notice to failure without compromising much on the accuracies, compared to Last DTC Model.

Figure 19:
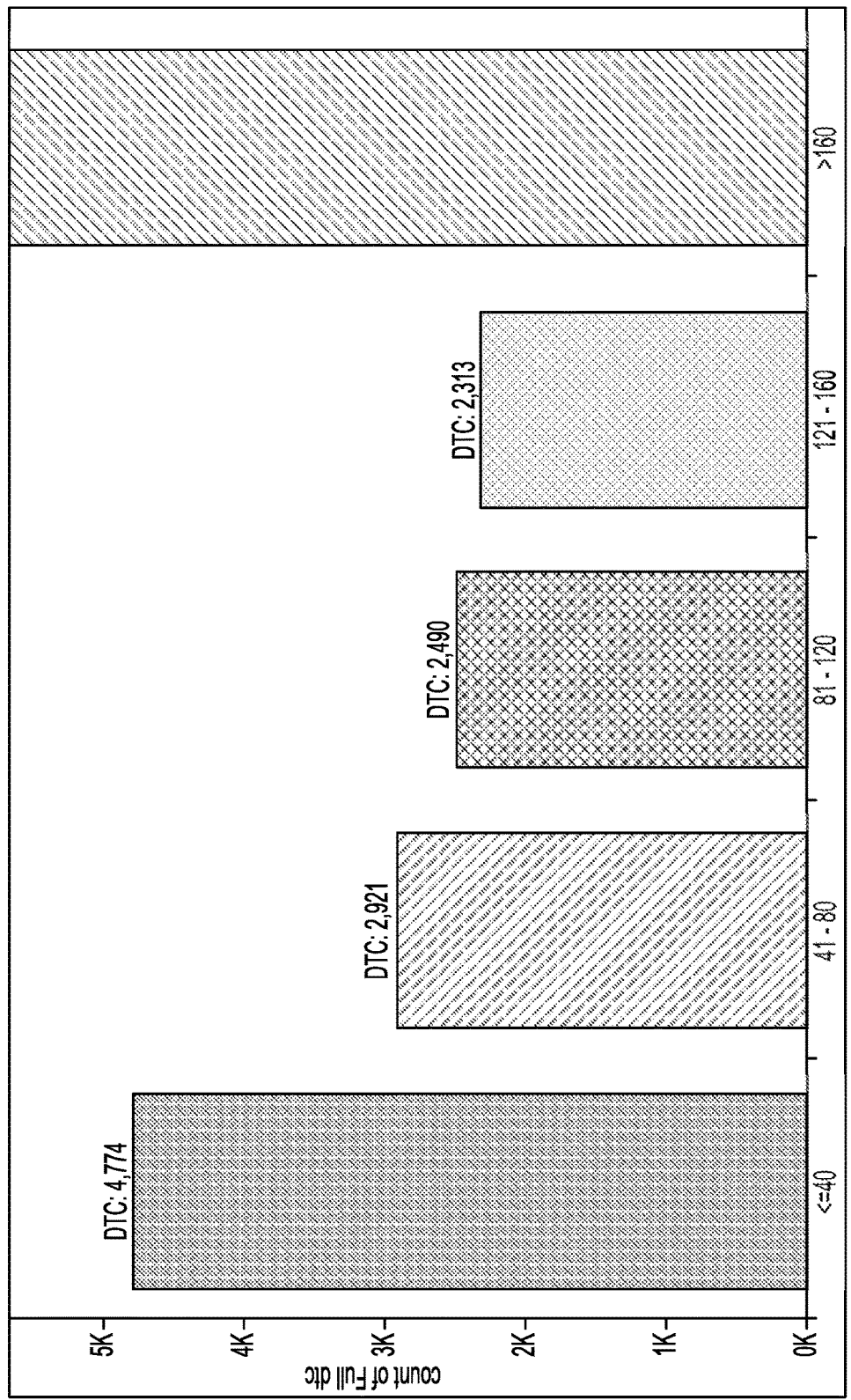
FIG. 19 shows distribution of DTC ages.
Figure 20A:
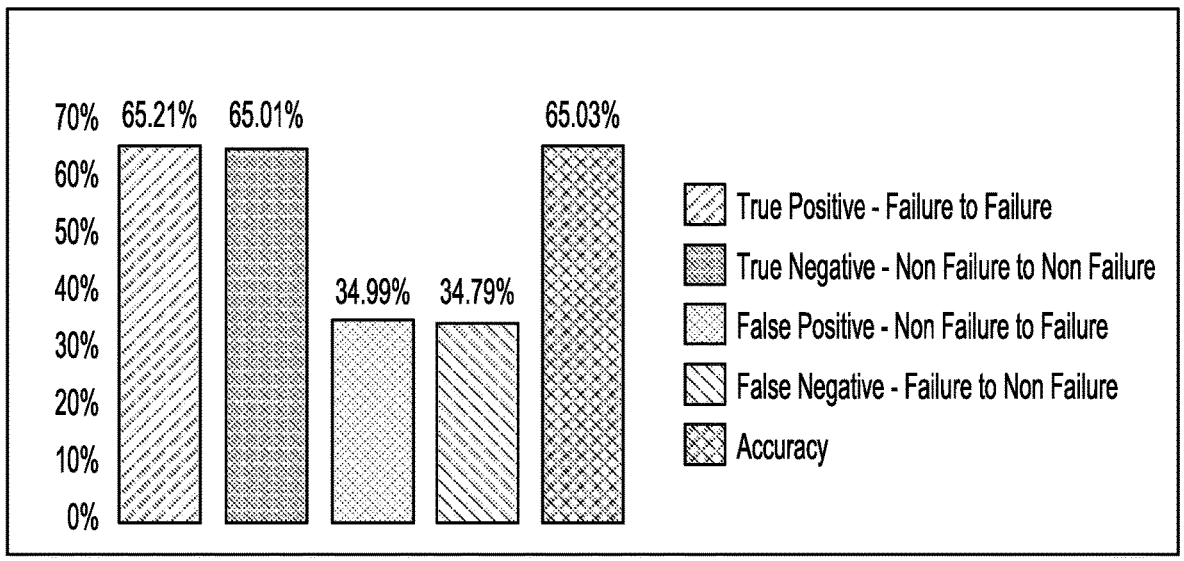
FIGS. 20A and 20B show model performance metrics for May and June 2016 datasets.
Figure 20B:
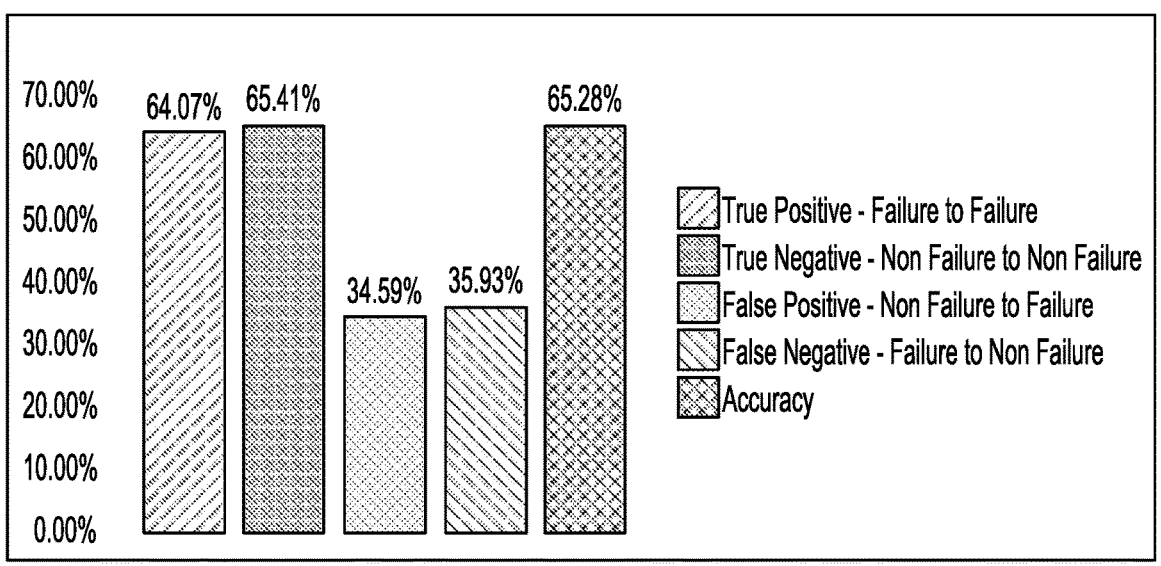
Figure 21A:
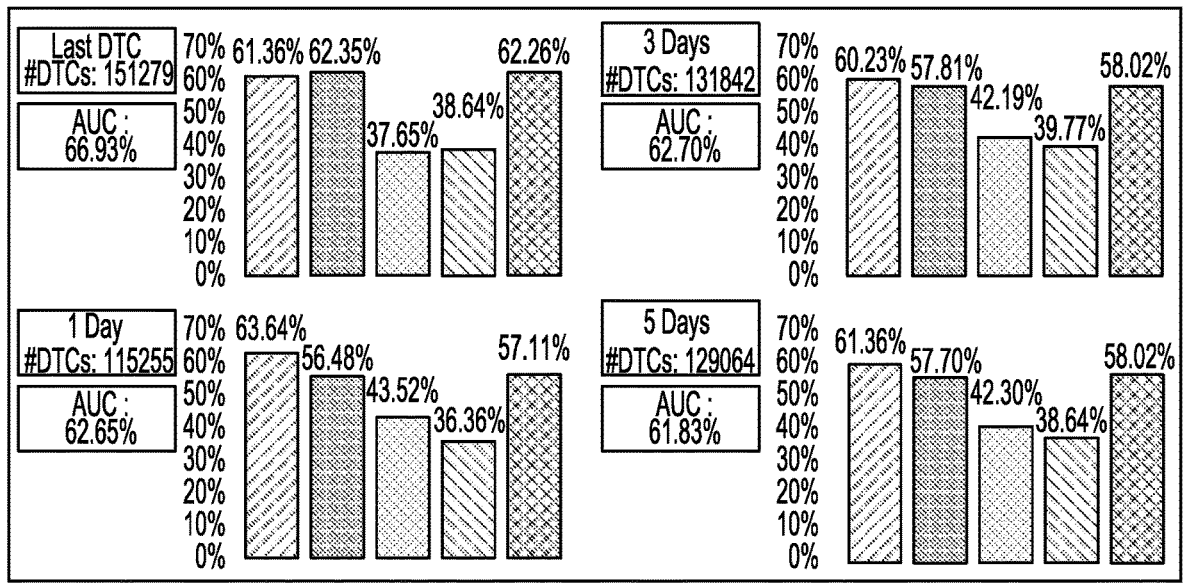
FIGS. 21A and 21B show model performance metrics with and without inclusion of battery voltage and odometer reading.
Figure 21B:
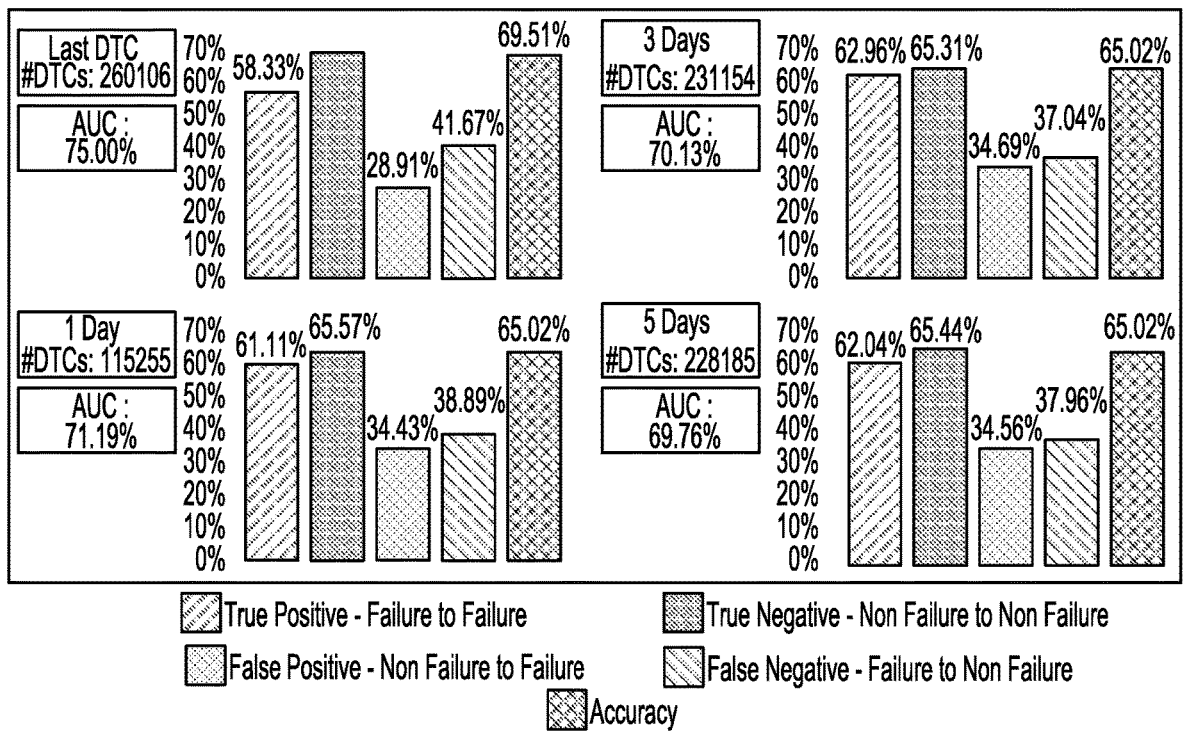

Based on the descriptive analysis and preliminary model results, the following conclusions can be drawn:
DTCs that lead to Failures more often than Non-Failures can be found with reasonable accuracy and sufficient advance notice before the actual breakdown. Chart 1900 of FIG. 19 shows distribution of DTC ages in days.
Pattern Ranking using Bayes' Rule is an effective method in identifying DTC patterns that predominantly cause Failures then Non-Failures both and gives consistent results across different time periods of more than 65%. FIGS. 20A and 20B show model performance metrics for May 2016 and June 2016 data in charts 2000*a* and 2000*b*, illustrating said consistency.
Failures can be predicted at least one day before actual breakdown by with accuracy more than 60% using patterns derived from data prior to the last DTC occurrence and pattern ranking based prediction. Model performance metrics based on the last DTC occurrence are shown in chart 2100*a* of FIG. 21A.
The addition of more data to the DTC patterns like Odometer, Battery Voltage can increase the prediction accuracy of the breakdown by 8% for at least 1 day before the actual failure predictions. Model performance metrics with additional parameters including odometer reading and battery voltage are shown in chart 2100*b* of FIG. 21B.

After model validation, processing proceeds to 370.

At 370, the method includes generating one or more trained model objects based on the preceding process steps. The trained model objects may include one or more statistical or mathematical relationships between DTC patterns, operating conditions, and failure probabilities learned in the above process blocks 310-360. The trained model objects may be stored as data structures, decision trees, or in other appropriate forms. Trained model objects may be instantiated as computer-readable instructions, suitable to be received, read, and used by electronic device 100 and implemented in method 200 at steps 240-270, for example. Trained model objects may also comprise one or more sets of instructions. These may be instructions to be displayed to an operator of a vehicle if certain conditions are met. The properties of trained model objects are discussed in greater depth above with reference to blocks 240-270. Once the trained model objects are generated, method 300 returns.

The disclosure provides for systems and methods that examine Diagnostic Trouble Codes (DTCs) to assist in early fault discovery. For example, vehicle or component failure may be detected using only DTCs and/or using DTCs without other elements to provide early detection of faulty conditions. Lead times (e.g., a time between receipt/detection of a DTC and an exhibition of an associated fault) may be determined for each DTC/fault association to determine which DTC provides the greatest lead time for a respective associated fault prediction. Accuracy (e.g., a ratio of correct predictions of failure to false positive predictions of failure) may also be determined for each DTC/fault association to determine which DTC provides the most accurate fault prediction. Using the above-described data, a system may select a subset of DTCs to monitor for a given fault and/or may weigh DTC statuses with respect to potential fault indications based on the above-described data. A technical effect of the selection and/or weighing of DTCs is that computing resources may be saved (due to reduced monitoring of only the most accurate/early warning DTCs) and component failure may be reduced (due to early detection of a failure before the failure either occurs or affects other systems).

In order to use DTC analysis as described above, in-vehicle computing frameworks may accept signals including the DTCs, allowing the system to be integrated into any vehicle to use standard DTC reporting mechanisms of the vehicle. Based on the DTCs, the disclosed systems and methods may generate custom reports, using current data for the vehicle, prior-recorded data for the vehicle, prior-recorded data for other vehicles (e.g., trends, which may be population-wide or targeted to other vehicles that share one or more properties with the vehicle), information from original equipment manufacturers (OEMs), recall information, and/or other data. In some examples, the reports may be sent to external services (e.g., to different OEMs) and/or otherwise used in future analysis of DTCs. DTCs may be transmitted from vehicles to a centralized cloud service for aggregation and analysis in order to build one or more models for predicting failures or degradation of vehicle components. In some examples, the vehicle may transmit data (e.g., locally-generated DTCs) to the cloud service for processing and receive an indication of potential failure. In other examples, the models may be stored locally on the vehicle and used to generate the indication of potential failure as DTCs are issued in the vehicle. The vehicle may store some models locally and transmit data to the cloud service for use in building/updating other (e.g., different) models outside of the vehicle. When communicating with the cloud service and/or other remote devices, the communicating devices (e.g., the vehicle and the cloud service and/or other remote devices) may participate in two-way validation of the data and/or model (e.g., using security protocols built into the communication protocol used for communicating data, and/or using security protocols associated with the DTC-based models.

The disclosure also provides for a method comprising determining a probability of failure of a vehicle based on one or more diagnostic trouble codes (DTCs), and indicating to an operator of the vehicle that failure is likely in response to the probability exceeding a threshold. In a first example of the method, the determining may additionally or alternatively be based on comparing the one or more DTCs to one or more trained model objects. A second example of the method optionally includes the first example, and further includes the method, wherein the trained model objects are generated using machine learning algorithms performed on historical DTC data. A third example of the method optionally includes one or both of the first example and the second example, and further includes the method, wherein the determining is further based on a plurality of operating conditions comprising an odometer reading and a battery voltage. A fourth example of the method optionally includes one or more of the first through the third examples, and further includes the method, wherein the indicating includes displaying a textual message via a screen, the textual message including instructions. A fifth example of the method optionally includes one or more of the first through the fourth examples, and further includes the method, wherein the instructions include a recommended number of days in which to visit a service station. A sixth example optionally includes one or more of the first through the fifth examples, and further includes the method, wherein the recommended number of days is based on the probability, a greater number of days being recommended for a lower probability and a smaller number of days being recommended for a higher probability; and wherein the number of days is further based on a vehicle subsystem generating the DTCs. A seventh example optionally includes one or more of the first through the sixth examples, and further includes the method, wherein the one or more DTCs comprise a plurality of DTCs, and in response to the DTCs being in a first order, determining the probability to be a first value, in response to the DTCs being in a second order, different from the first order, determining the probability to be a second value, lower than the first value.

The disclosure also provides for a system, comprising a vehicle, a plurality of vehicle subsystems, a controller with machine-readable instructions stored in non-transitory memory, for receiving one or more diagnostic trouble codes (DTCs) from the vehicle subsystems, generating a probability of failure of the vehicle by comparing the one or more DTCs to one or more trained model objects, and indicating to an operator of the vehicle that failure is likely if the probability exceeds a threshold. In a first example of the system, the threshold may additionally or alternatively be based on the vehicle subsystem generating the DTCs. A second example of the system optionally includes the first example, and further includes the system, wherein the threshold is lower when the DTCs are received from a powertrain subsystem and higher when the DTCs are received from a chassis subsystem. A third example of the system optionally includes one or both of the first example and the second example, and further includes the system, wherein the indicating comprises displaying a message to the operator, the message including one or more instructions, and wherein the instructions are based on the comparing of the DTCs to the trained model objects. A fourth example of the system optionally includes one or more of the first through the third examples, and further includes the system, wherein the instructions are based on a vehicle subsystem generating the DTCs, wherein an instruction to turn off an air conditioner is generated in response to the DTCs being generated by an HVAC system, and wherein an instruction to reduce engine load is generated in response to the DTCs being generated by an engine system. A fifth example of the system optionally includes one or more of the first through the fourth examples, and further includes the system, wherein the instructions are further based on the probability, the instructions including a recommended time within which to visit a service station, the recommended time being inversely related to the probability. A sixth example of the system optionally includes one or more of the first through the fifth examples, and further includes the system, wherein the controller is configured to disregard DTCs with an age greater than a threshold age; wherein the trained model objects are generated at a remote serve via machine learning algorithms on historical DTC data; and wherein the trained model objects are received at the vehicle from the remote server in response to an update request.

The disclosure also provides for a method, comprising receiving a diagnostic trouble code (DTC) and an engine operating parameter, comparing the DTC and engine operating parameter to a trained model object to generate a probability of failure of a vehicle and an instruction, and, in response to the probability of failure being greater than a threshold, displaying the instruction to an operator of the vehicle on a screen. In a first example of the method, the trained model object may additionally or alternatively specify one or more relationships between DTCs, engine operating parameters, and the probability of failure. A second example of the method optionally includes the first example, and further includes the method, further comprising receiving the trained model object from a remote server in response to an update request. A third example of the method optionally includes one or both of the first example and the second example, and further includes the method, wherein the trained model object is generated using one or more computer learning techniques, and wherein the computer learning techniques include non-sequential pattern mining, association rule mining, and pattern ranking with Bayes' Theorem. A fourth example of the method optionally includes one or more of the first through the third examples, and further includes the method, wherein the computer learning techniques are applied to historical data comprising vehicle models, odometer readings, battery voltage readings, DTC patterns, and failure states.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the electronic device 100 described with reference to FIG. 1. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and subcombinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on the associated objects. The following claims particularly point out subject matter from the above disclosure that is regarded as novel and non-obvious.

The invention claimed is:

1. A method, comprising:
monitoring one or more ECUs of a vehicle to detect diagnostic trouble codes (DTCs);
comparing one or more detected DTCs to one or more rules or trained model objects;
determining a probability of failure of the vehicle based on the one or more detected DTCs, the probability of failure being supplied by the one or more rules or trained model objects;
for a training set including a plurality of sessions, deriving a threshold probability by:
identifying a set of all possible patterns of DTCs for the plurality of sessions,
estimating a probability of failure, using Bayes' theorem, for each possible pattern of DTCs of the set of all possible patterns of DTCs,
creating an ordered list of possible patterns of DTCs by ordering the set of all possible patterns of DTCs by the probability of failure for each possible pattern of DTCs,
determining a sensitivity curve and a specificity curve for the ordered list of possible patterns of DTCs, and
selecting the threshold probability at an intersection of the sensitivity curve and the specificity curve; and
displaying one or more instructions for an operator of the vehicle via one or more output devices of the vehicle in response to the probability of failure for the pattern of one or more generated DTCs exceeding the threshold probability,
wherein the probability of failure of the vehicle is dependent upon a sequential order of detection of the one or more detected DTCs.

2. The method of claim 1, wherein the trained model objects are generated using machine learning algorithms performed on historical DTC data.

3. The method of claim 1, wherein the determining is further based on a plurality of operating conditions comprising an odometer reading and a battery voltage.

4. The method of claim 1, wherein the one or more instructions include a textual message displayed via a screen.

5. The method of claim 4, wherein the instructions include a recommended number of days in which to visit a service station.

6. The method of claim 5, wherein the recommended number of days is based on the probability of failure for the one or more detected DTCs, a greater number of days being recommended for a lower probability of failure and a smaller number of days being recommended for a higher probability of failure; and wherein the number of days is further based on a vehicle subsystem generating the DTCs.

7. The method of claim 1, wherein the probability of failure of the vehicle is dependent upon a mileage of the vehicle.

8. The method of claim 1, wherein the probability of failure of the vehicle is dependent upon an engine load of an engine of the vehicle.

9. The method of claim 1, wherein the probability of failure of the vehicle is dependent upon a speed of the vehicle.

10. The method of claim 1, wherein the one or more instructions for the operator of the vehicle depend upon the sequential order of detection of the one or more detected DTCs.

* * * * *